US011394707B2

(12) United States Patent
Lee et al.

(10) Patent No.: US 11,394,707 B2
(45) Date of Patent: Jul. 19, 2022

(54) CLAMSHELL DEVICE AUTHENTICATION OPERATIONS

(71) Applicant: Lenovo (Singapore) Pte. Ltd., Singapore (SG)

(72) Inventors: Jonathan Co Lee, Cary, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 157 days.

(21) Appl. No.: 16/600,758

(22) Filed: Oct. 14, 2019

(65) Prior Publication Data
US 2021/0112056 A1  Apr. 15, 2021

(51) Int. Cl.
G06F 21/00 (2013.01)
H04L 9/40 (2022.01)
G06F 21/32 (2013.01)
H04W 12/06 (2021.01)
G06F 1/16 (2006.01)
G06F 21/34 (2013.01)
G06F 21/36 (2013.01)
G06V 40/13 (2022.01)

(52) U.S. Cl.
CPC ............ *H04L 63/0861* (2013.01); *G06F 1/16* (2013.01); *G06F 21/32* (2013.01); *G06F 21/34* (2013.01); *G06F 21/36* (2013.01); *G06V 40/13* (2022.01); *H04L 63/0853* (2013.01); *H04W 12/06* (2013.01)

(58) Field of Classification Search
CPC . H04L 63/0861; H04L 63/0853; G06F 21/32; G06F 1/16; G06F 21/34; G06F 21/36; G06F 21/86; H04W 12/06; G06K 9/00013
See application file for complete search history.

(56) References Cited
U.S. PATENT DOCUMENTS

| 9,392,460 | B1 * | 7/2016 | Blake | H04L 67/306 |
| 9,921,612 | B2 | 3/2018 | Tucker et al. | |
| 2002/0150282 | A1 * | 10/2002 | Kinsella | G06F 21/32 382/124 |
| 2013/0263252 | A1 * | 10/2013 | Lien | G06F 1/3215 726/19 |
| 2016/0042202 | A1 * | 2/2016 | Murray | H02J 50/10 320/108 |
| 2016/0098878 | A1 * | 4/2016 | Cabouli | H04L 63/0853 340/5.52 |

(Continued)

OTHER PUBLICATIONS

Cho et al., entitled "Design of optimized cantilever form of a piezoelectric energy harvesting system for a wireless remote switch", Sensors and Actuators A: Physical, 280 (2018) 340-349 (10 pages).

(Continued)

*Primary Examiner* — Jeffrey C Pwu
*Assistant Examiner* — William A Corum, Jr.
(74) *Attorney, Agent, or Firm* — Brian J. Pangrle

(57) ABSTRACT

A method can include commencing generation of authentication data using a first human input component operatively coupled to a device, where the device includes a processor, memory accessible to the processor, a display operatively coupled to the processor, and a second human input component that includes an input surface, and where the input surface is inaccessible at the time of commencing generation of the authentication data; authenticating the authentication data; and responsive to the authenticating, transitioning the device to a state where the input surface of the second human input component is accessible and enabled for input.

20 Claims, 14 Drawing Sheets

(56) References Cited

U.S. PATENT DOCUMENTS

| | | | | |
|---|---|---|---|---|
| 2017/0103632 | A1* | 4/2017 | Tolle | G01S 17/74 |
| 2017/0235355 | A1* | 8/2017 | Alshinnawi | G06F 1/3278 |
| | | | | 713/323 |
| 2017/0244730 | A1* | 8/2017 | Sancheti | H04W 12/06 |
| 2018/0253583 | A1* | 9/2018 | Nogueyra | G06K 9/0004 |
| 2019/0205591 | A1* | 7/2019 | Ban | G06K 9/0002 |
| 2019/0227602 | A1* | 7/2019 | Trim | G06K 9/00604 |
| 2019/0278339 | A1* | 9/2019 | Cooper | G06F 1/1616 |
| 2019/0318133 | A1* | 10/2019 | Lulic | H04L 9/004 |
| 2020/0100574 | A1* | 4/2020 | Bloom | A45C 3/06 |

OTHER PUBLICATIONS

Motorola Mobility, MOTO X4 User's Guide, 2017 (58 pages).
Khanse, Different System Sleep States in Windows 10/8, www.thewindowsclub.com, Sep. 5, 2013 (4 pages).
Texas Instruments, TPS62122EVM, User's Guide, SLVU388—Aug. 2010 (14 pages).
Lenovo, Thinkpad X1 Carbon Hardware Maintenance Manual, Jan. 2014 (98 pages).
Apple, Find My iPhone: Erase your device, Aug. 8, 2019 (3 pages).
Apple, Use Touch ID on iPhone and iPad, Apr. 24, 2019 (5 pages).
Bonnington, The Trouble With Apple's Touch ID Fingerprint Reader, WIRED, 2013 (4 pages).
System Plus Consulting, Qualcomm Snapdragon Sense ID 3D Qualcomm's New Ultrasonic Fingerprint Sensor, Reverse Costing & Technology Analysis Report, Aug. 2016 (5 pages).
Lenovo, How to configure Fingerprint Reader software—ThinkPad, Jun. 8, 2015 (19 pages).
Microsoft, Introduction to the Windows Biometric Framework (WBF), Dec. 15, 2008 (12 pages).

* cited by examiner

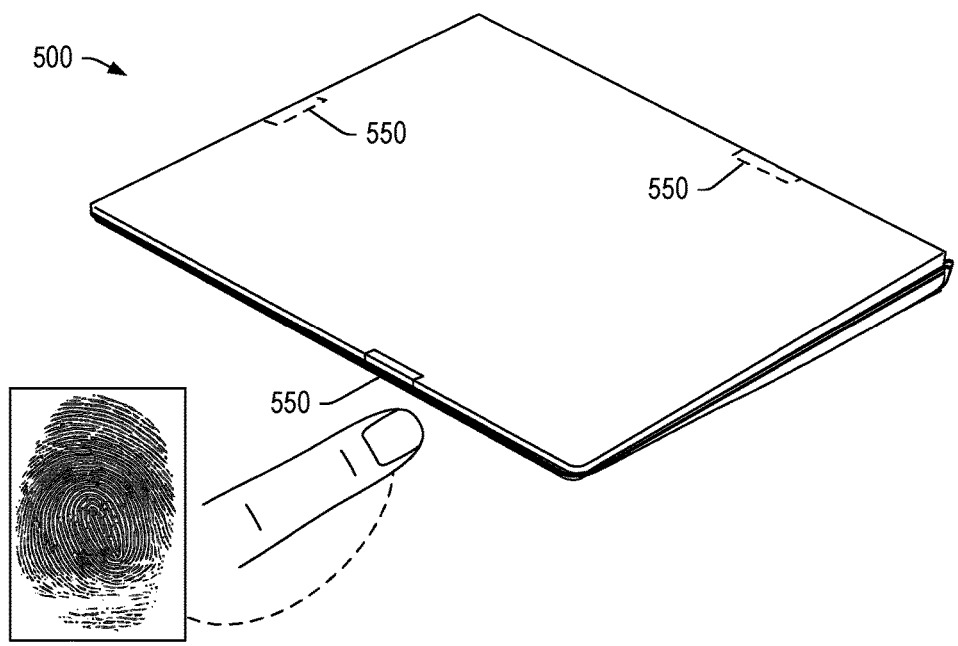
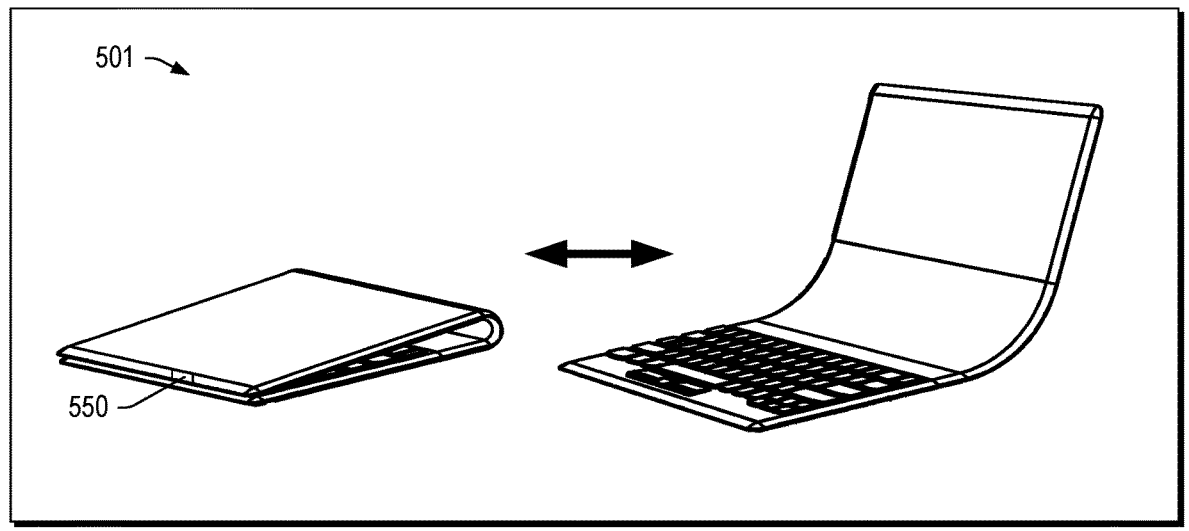
FIG. 5

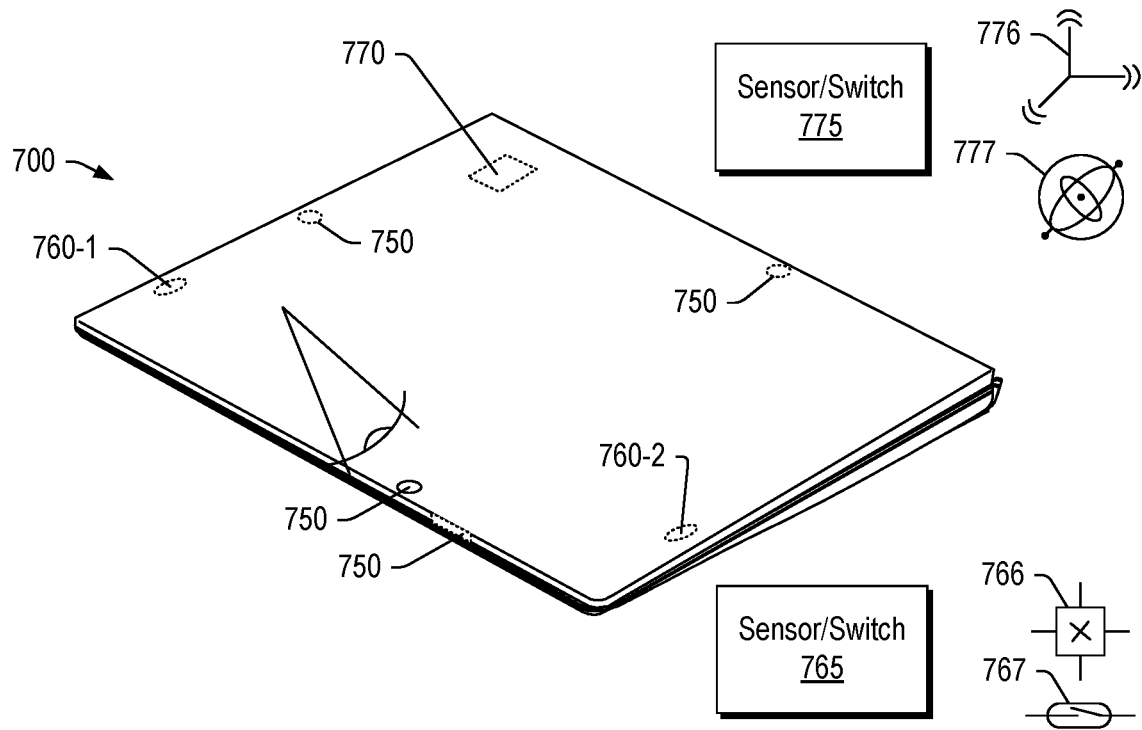
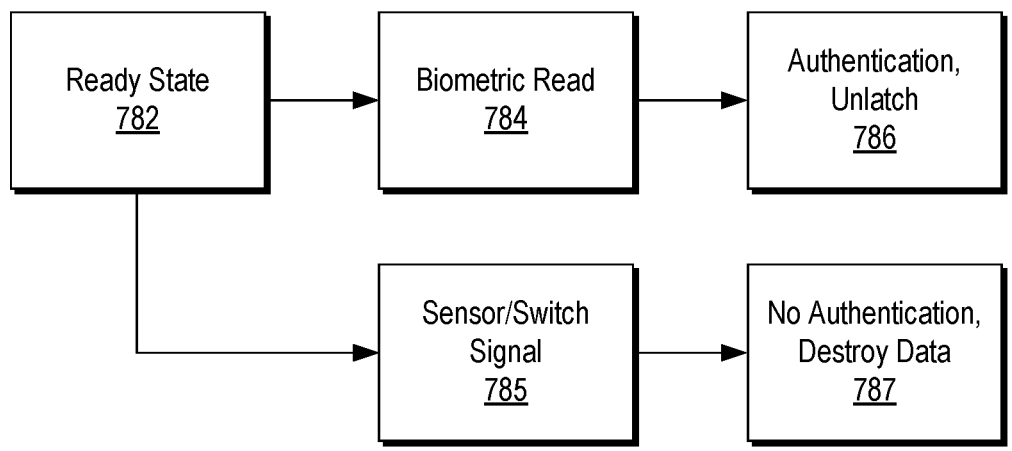
FIG. 7

| GUI 890 | | | | |
|---|---|---|---|---|
| Options | Opening w/o Authenticating | Closing w/o Authenticating | Authenticate on Opening | Authenticate on Closing |
| Enter OS | | | X | |
| Power State SX | | | | |
| Require Authentication | | X | | |
| Power Down | | X | | |
| Enable Tamper Alarm | | X | | |
| Allow Opening w/o Authentication | | | | X |
| Do Nothing | X | | | |

| | Opening w/o Authenticating | Closing w/o Authenticating | Authenticate on Opening | Authenticate on Closing |
|---|---|---|---|---|
| Fingerprint | Options ▽ | Options ▽ | Options ▽ | Options ▽ |
| Image Recognition | Options ▽ | Options ▽ | Options ▽ | Options ▽ |

GUI 990

Method 1300

Commence generation of authentication data using a first human input component operatively coupled to a device, where the device includes a processor, memory accessible to the processor, a display operatively coupled to the processor, and a second human input component that includes an input surface, and where the input surface is inaccessible at the time of commencing generation of the authentication data
1310

Authenticate the authentication data
1330

Responsive to the authentication, transition the device to a state where the input surface of the second human input component is accessible and enabled for input
1350

FIG. 13

CLAMSHELL DEVICE AUTHENTICATION OPERATIONS

TECHNICAL FIELD

Subject matter disclosed herein generally relates to biometric technology for computing or other devices.

BACKGROUND

A device can include or be operatively coupled to a biometric sensor such as, for example, a fingerprint reader.

SUMMARY

A method can include commencing generation of authentication data using a first human input component operatively coupled to a device, where the device includes a processor, memory accessible to the processor, a display operatively coupled to the processor, and a second human input component that includes an input surface, and where the input surface is inaccessible at the time of commencing generation of the authentication data; authenticating the authentication data; and responsive to the authenticating, transitioning the device to a state where the input surface of the second human input component is accessible and enabled for input. An assembly can include a first human input device; a device that includes a processor, memory accessible to the processor, a display operatively coupled to the processor, and a second human input device where the second human input device includes an input surface; circuitry that commences generation of authentication data using the first human input component operatively coupled to the device where the input surface is inaccessible at the time of commencement of the generation of the authentication data; circuitry that authenticates the authentication data; and circuitry that, responsive to the authentication of the authentication data, transitions the device to a state where the input surface of the second human input component is accessible and enabled for input. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

FIG. 5 is a diagram of example of devices that include an example of a human input component;

FIG. 7 is a series of diagrams of an example of a device that includes an example of a human input component and an example of a method;

FIG. 13 is a diagram of an example of a method; and

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
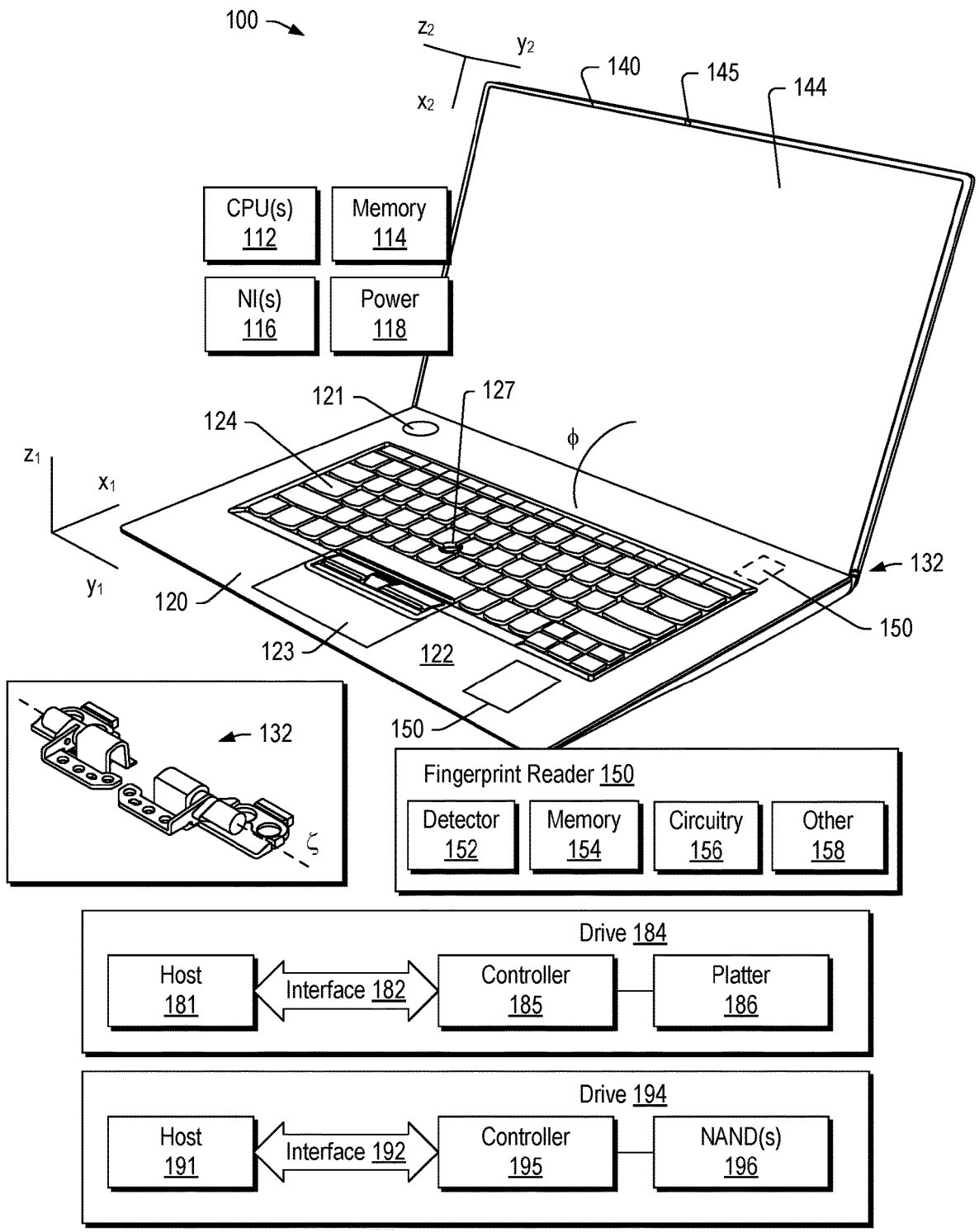
FIG. 1 is a diagram of an example of a device and an example of a biometric input component that may be part of the device.

FIG. 1 shows an example of a device 100 that includes a keyboard housing 120 and a display housing 140 that are pivotable with respect to each other via movement about one or more hinges 132 (e.g., consider one or more hinge assemblies). The device 100 may be a device such as, for example, a computing device (e.g., an information handling device).

As an example, the device 100 may include one or more processors 112, memory 114 (e.g., one or more memory devices accessible to at least one of the one or more processors 112, etc.), one or more network interfaces 116, and one or more power cells 118. Such components may be, for example, housed with the keyboard housing 120, the display housing 140, or the keyboard housing 120 and the display housing 140.

As shown in the example of FIG. 1, the keyboard housing 120 includes a power button 121, a frontal surface 122, a touchpad 123, a keyboard 124 with keys, and a joystick 127; and the display housing 140 includes a display 144. In such an example, the keyboard 124 is defined in a first Cartesian coordinate system as having a depth along an x-axis ($x_1$), a width along a y-axis ($y_1$) and a height or thickness along a z-axis ($z_1$) that extends in a direction outwardly away from touch surfaces of keys of the keyboard 124 and the display 144 is defined in a second Cartesian coordinate system as having a depth along an x-axis ($x_2$), a width along a y-axis ($y_2$) and a height or thickness along a z-axis ($z_2$) that extends in a direction outwardly away from a viewing surface of the display 144. As an example, a coordinate system may be right-handed or left-handed.

In the example of FIG. 1, the display housing 140 includes a camera 145, which may be, for example, a video camera such as a webcam. As an example, the camera 145 may include one or more LEDs such as, for example, a flash LED, an IR illumination LED (e.g., for low light situations), etc. As an example, the camera 145 may include a focus mechanism such as, for example, an autofocus mechanism, which may be operatively coupled to or include a rangefinder. As shown in the example of FIG. 1, the camera 145 is in a plane with the display 144 such that a user can be in communication with another individual where visual information is rendered to the display 144 while the camera 145 captures and transmits images (e.g., video) of the user to a remote location. In such an example, the display 144 may render one or more captured images as captured by the camera 145.

In the example of FIG. 1, the one or more hinges 132 pivotably connect the keyboard housing 120 and the display housing 140 for orienting the display housing 140 with respect to the keyboard housing 120. For example, orientations may include orientations definable with respect to an axis (e.g., or axes). As an example, a device may include a single hinge such as a swivel hinges that provides for pivoting and swiveling of the display housing 140 with respect to the keyboard housing. In such an example, the display housing 140 may be swiveled by 180 degrees and then pivoted such that a back side of the display housing 140 is adjacent the keyboard housing 120 and the display 144 is facing outwardly (e.g., consider a tablet mode or tablet orientation). As an example, the one or more hinges 132 may provide for a tablet mode or tablet orientation. FIG. 1 shows an example of the one or more hinges 132, which can include a left side hinge and a right side hinge where each of the hinges includes a barrel (e.g., consider pin in barrel, etc.) and leaves where one leaf can be fixed to the keyboard housing 120 and another leaf can be fixed to the display housing 140. As an example, a barrel of a hinge can define an axis about which the keyboard housing 120 and the display housing 140 can be rotated. As shown, an angle $\phi$ can be defined as an angle between a plane defined by the keyboard housing 120 and a plane defined by the display housing 140.

As an example, a user may transition the device 100 from a closed, clamshell orientation to an open orientation, which may be, for example, the orientation shown in FIG. 1. In such an example, the angle $\phi$ can be 0 degrees for the closed, clamshell orientation and greater than approximately 90 degrees for the orientation shown. Similarly, a user may transition the device 100 from an open orientation to the closed, clamshell orientation. As an example, a user may have a regular open orientation, for example, as may be associated with use of the device 100 on a desktop.

Various computing devices such as laptop, or notebook, computing devices can be characterized at least in part by a footprint. For example, the device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1. As shown, the housings 120 and 140 may be substantially the same in terms of footprint.

The device 100 of FIG. 1 is shown as a laptop (e.g., laptop computer), which may be considered to be a mobile device, for example, a device being of a size and a weight suitable for transport (e.g., in a shoulder bag, a handbag, a briefcase, etc.). For example, the footprint of the device 100 may be substantially rectangular with dimensions less than approximately 50 cm×50 cm and greater than approximately 7 cm×7 cm.

As an example, the keyboard housing 120 can include the frontal surface 122 with a fingerprint reader 150. In such an example, the fingerprint reader 150 is accessible only when the device 100 is open, for example, by at least approximately 5 degrees (see, e.g., the angle $\phi$). As shown, the fingerprint reader 150 can include a detector 152, memory 154, circuitry 156 and one or more other components 158. The fingerprint reader 150 can be provided as a unit that can be integrated into the device 100 such that the fingerprint reader 150 is operatively coupled to the device 100, for example, via a biometric framework. Such a framework may allow for interactions between the fingerprint reader 150 and one or more levels of one or more environments (e.g., an operating system environment, a BIOS environment, a pre-BIOS environment, etc.). As an example, an environment may be established via execution of instructions by one or more processors where the instructions may be stored in memory (e.g., boot memory, etc.).

A fingerprint reader may include circuitry that can capture a digital image of a fingerprint, which may be, for example, referred to as a "live" scan. A scan can be a dataset that can be digitally processed to create a biometric template (e.g., a collection of extracted features) which may be referred to as a base case. As an example, a biometric template or base case may be stored and accessible for purposes of matching (e.g., to authenticate a live scan, etc.). A stored biometric template, base case, or information derived therefrom and stored in memory prior to a live scan can be referred to as historical fingerprint data. As an example, a fingerprint reader can generate fingerprint data representative of a fingerprint of a finger where such data may be referred to as live scan data. As an example, a fingerprint reader and/or a biometric framework can include circuitry that authenticates a fingerprint via an authentication process and that identifies a change of the fingerprint based at least in part on the generated fingerprint data (e.g., live scan data) and historical fingerprint data (e.g., stored data from or based at least in part on one or more prior scans, etc.).

A fingerprint reader may utilize one or more types of circuitry. For example, consider a fingerprint reader that utilizes one or more of optical, capacitive, RF, thermal, piezoresistive, ultrasonic, piezoelectric, or MEMS circuitry.

As an example, a fingerprint reader can include one or more features of the NEXT Biometrics NB-1010-U and/or NB-2020-U fingerprint readers, which implement thermal technology. As an example, a fingerprint reader can include one or more features of the EgisTec ET300 fingerprint reader. As an example, a fingerprint reader can include one or more features of the Fingerprint Cards FPC 1025 fingerprint reader. As an example, a fingerprint reader can include one or more features of the Qualcomm Snapdragon Sense™ ID 3D fingerprint reader, which implements ultrasonic technology and a biometric integrated circuit that provides for data security. Ultrasonic technology (e.g., piezoelectric transducers, piezoelectric materials, etc.) can allow for scanning through an OLED display (e.g., approximately 1200 μm thick), scanning through aluminum (e.g., approximately 650 μm thick), and scanning through glass (e.g., approximately 800 μm thick).

As an example, a fingerprint reader can include one or more features of the "Touch ID" device (Apple, Inc., Cupertino, Calif.), which is built into the home button of the IPHONE 5 device (Apple, Inc.). For example, a fingerprint reader can include a sapphire crystal or other hard material that is scratch resistance and a capacitive touch sensor that can detect a fingerprint. For example, consider a sensor that applies a current that can be conducted through a finger to create a map of a finger's dermis. Such a fingerprint reader may be relatively thin (e.g., less than 300 microns) and have a suitable resolution (e.g., 100 pixels per inch or more).

Certain restrictions may be placed on operation of a biometric reader, for example, if a device has been rebooted, has not been unlocked for a certain number of hours, has a SIM card removed, the biometric reader may be unavailable for biometric input and another type of input required for logon.

As an example, the camera 145 may be suitable for biometric input. For example, consider facial recognition, eye recognition, etc. In such an example, one or more types of circuitry described with respect to the fingerprint reader 150 may be utilized for purposes of authentication based on biometric input via the camera 145.

As an example, circuitry associated with one or more biometric input devices may utilize one or more application programming interfaces (APIs). For example, the ANDROID operation system includes a BiometricPrompt (API level 29), which includes the following public methods: public void authenticate (CancellationSignal cancel, Executor executor, BiometricPrompt.AuthenticationCallback callback), which is an API call that warms up biometric hardware, displays a system-provided dialog, and starts scanning for a biometric; and public void authenticate (BiometricPrompt.CryptoObject crypto, CancellationSignal cancel, Executor executor, BiometricPrompt.AuthenticationCallback callback), which is an API call that warms up biometric hardware, displays a system-provided dialog, and starts scanning for a biometric. As an example, consider another ANDROID method, which is public void onAuthenticationSucceeded (BiometricPrompt.AuthenticationResult result), which is called when a biometric is recognized for input biometric information (e.g., a scan, etc.).

As an example, a biometric reader (e.g., a fingerprint reader, a camera, etc.) can be in or transitioned to a particular power state, which may be a standby state. For example, a transition may occur where another component is in a low power state as a polling state, a wait state, etc. Such a component can be powered at all times (e.g., when the battery is installed, etc.) or triggered by another component that is powered at all times.

As an example, a biometric reader can be utilized to authenticate biometric input and then wake and unlock an operating system environment, a boot environment, etc.

FIG. 1 also shows examples of drives, including a drive 184 and a drive 194. As shown in FIG. 1, a host 181 can be operatively coupled to a drive controller 185 via an interface 182 where the drive controller 185 can control storage and retrieval of data from a platter 186. As an example, the drive 184 can be a hard disk drive (HDD) where the platter 186 can be a circular disk on which magnetic data are stored. As an example, the platter 186 can be made of a metallic material or a ceramic material (e.g., glass). The drive 184 can be utilized by the host 181 (e.g., a host operating system with associated host circuitry) for various data storage and retrieval purposes. As an example, the drive 184 may store an operating system (OS) (e.g., operating system instructions) or a portion thereof. As an example, the drive 184 may store user data, which may include confidential data, which may be in a non-encrypted or an encrypted form. As an example, a device such as the device 100 can provide electrical power to the drive 184 for its operation (e.g., to spin the platter 186, to operate the controller 185, etc.).

As shown in FIG. 1, a host 191 can be operatively coupled to a drive controller 195 via an interface 192 where the drive controller 195 can control storage and retrieval of data from one or more NANDs 196 (e.g., or other type of flash memory). As an example, the drive 194 can be a solid-state drive (SSD) where data are stored on the one or more NANDs 196. The drive 194 can be utilized by the host 191 (e.g., a host operating system with associated host circuitry) for various data storage and retrieval purposes. As an example, the drive 194 may store an operating system (OS) (e.g., operating system instructions) or a portion thereof. As an example, the drive 194 may store user data, which may include confidential data, which may be in a non-encrypted or an encrypted form. As an example, a device such as the device 100 can provide electrical power to the drive 194 for its operation (e.g., to operate the one or more NANDs 196, to operate the controller 195, etc.).

Figure 2:
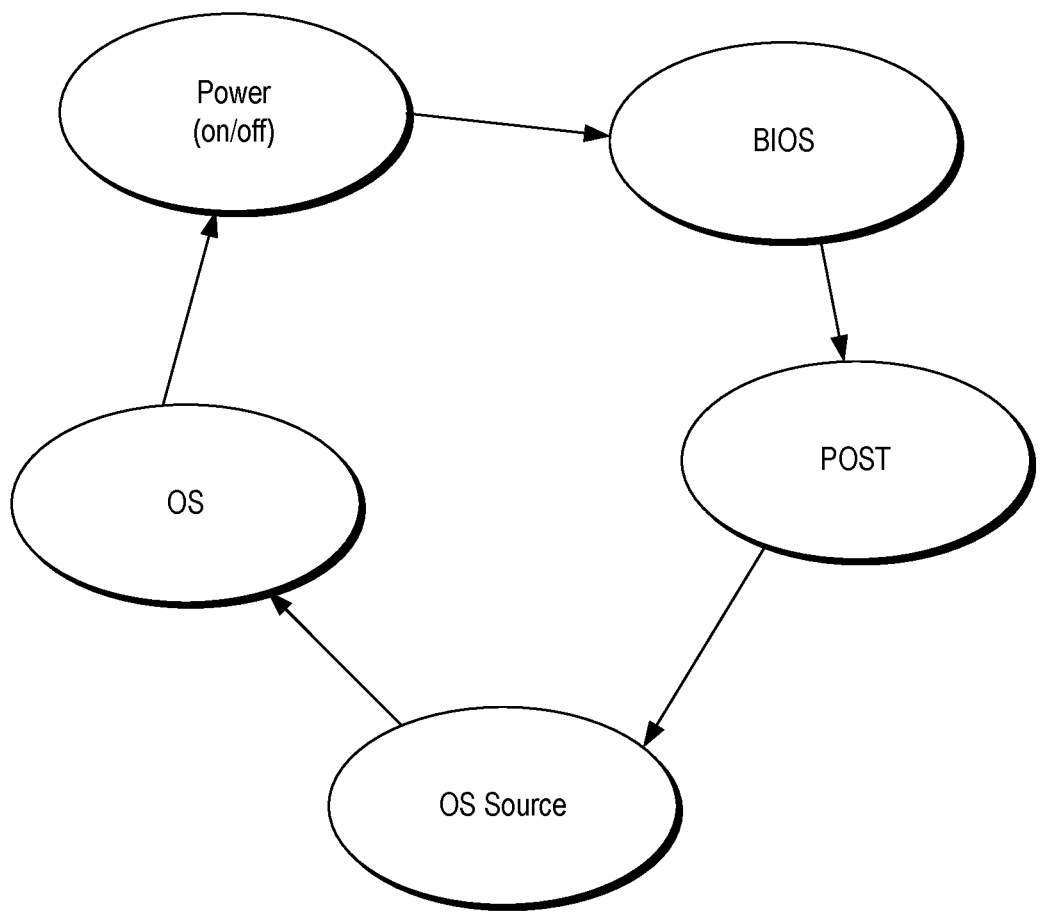
FIG. 2 is a state diagram of various examples of boot process states.

FIG. 2 shows a state diagram 200 of an example of a process that can include various state transitions. The state diagram 200 may be utilized in a process such as a boot process. For example, the device 100 of FIG. 1 includes the one or more processors 112 and may also include a Trusted Platform Module (TPM). As shown in FIG. 2, a power state can transition responsive to a power on to a BIOS state, which can transition to a POST state (e.g., "power-on self-test" for hardware analysis), which can transition to an OS source state (e.g., storage medium such as a drive or other source that can provide an OS), which can transition to an OS state (e.g., establishment of an OS environment or OS host environment), which can, responsive to a power signal, transition to the power state with power off.

As mentioned, a device may include a TPM, which can include various secure registers, which may be or include platform configuration registers (PCRs). During a boot process, core root of trust measurement (CRTM) code and BIOS code components can be executed with assurances from a TPM where, for example, the TPM "measures" the CRTM code and BIOS code by storing values in the PCRs. For example, a so-called "extend" function may hash a stored value and a code value and store the result in a PCR. For example, a PCR may store SHA-1(value1∥value2) where value1 is a SHA-1 hash of a code value and value2 is a code value concatenated to value1. The concatenated value is SHA-1 hashed and stored to the PCR. A log may also be generated that corresponds to operations performed by the TPM, for example, as CRTM code calls for measurement of a BIOS code component (e.g., system management mode handler code, referred to herein as SMM code or SMM handler code), as the BIOS code component calls for measurement of another code component, etc.

As an example, a device may be provided with a same-party or a third-party OS. In the example of FIG. 2, after hardware is up and running, BIOS can provide instructions for loading the OS (e.g., OS components). After loading the OS components, a dynamic root of trust measurement (DRTM) session may commence that aims to extend assurances of secure computing beyond the CRTM (e.g., to maintain a chain of trust as applications or other modules are executed).

As an example, a device can include various power states. For example, consider the WINDOWS OS states that include system power states S0 (working state, not in a sleep state), S1 (processor stopped and standby mode), S2 (processor clock is off and bus clocks; power consumption, for example, between 5 W and 30 W; processor context and contents of system cache are lost), S3 (data or context saved to RAM and hard drives, fans, etc. are shut down; power consumption, for example, less than 5 W; wake-on-LAN); and S4 (data or context is saved to drive; "hibernate"; hardware powers off components; OS context maintained in a hibernate file prior to entering S4; upon restart, loader reads and jumps to pre-hibernation; power consumption, for example, less than 5 W).

As an example, a device may include a connected standby (CS) state that aims to provide an instant on and instant off user experience, which can stay fresh (up to date) and reachable whenever a suitable network is available. As an example, for some WINDOWS OS, in the CS state, the S3 state is disabled and an additional power state known as S0 Low Power Idle is enabled.

As an example, various states (e.g., sleep, hibernate, etc.) are device wide coordinated sleep states where an OS enters or exits one of these states, it transitions in a coordinated manner across applications, services, drivers, components, and firmware. The aforementioned CS state may be viewed as not being a sleep state and not being a fully coordinated, whole device power state transition. In a CS state, a device can be on but its display can be powered off and the device can be driven to be as idle as possible (e.g., to provide a seamless on/off experience and constant connectivity while delivering an extended battery life). A CS state may be utilized to replace a sleep experience.

As explained, various states can be interrelated and can be linked to input such as biometric input. As mentioned, where a device has not been unlocked for a certain number of hours, biometric input may be required for transitioning from one state to another state.

As an example, for a clamshell type of device such as the device 100 of FIG. 1, various orientation states exist, which can be interrelated with various other states, which can include power states, boot process states, etc. As an example, consider a lid-based state where depending on the position of a display housing of a device with respect to a keyboard housing of the device, the device can transition from one state to another state. As an example, some WINDOWS OSs include options that can be selectable by a user as to what happens when a lid is closed and/or when a lid is opened. For example, consider "Do Nothing", "Hibernate", "Shut Down" and whether a password is required when the lid is opened after a transition.

As an example, a device can include a sensor that can detect when a clamshell device is in a closed, clamshell orientation or not. For example, consider a magnetic sensor (e.g., a Hall sensor, etc.) that includes a component in one housing and another component in another housing where a signal is generated when the components are in close proximity or not in close proximity.

As an example, a clamshell device can include one or more types of physical lock mechanisms such as a latch that may help to secure the device in a closed, clamshell orientation, for example, for transport, storage, etc. As an example, some clamshell devices may have a hinge or hinges with mechanical resistance that is sufficient to avoid undesirable opening for a limited range of conditions.

Figure 3:
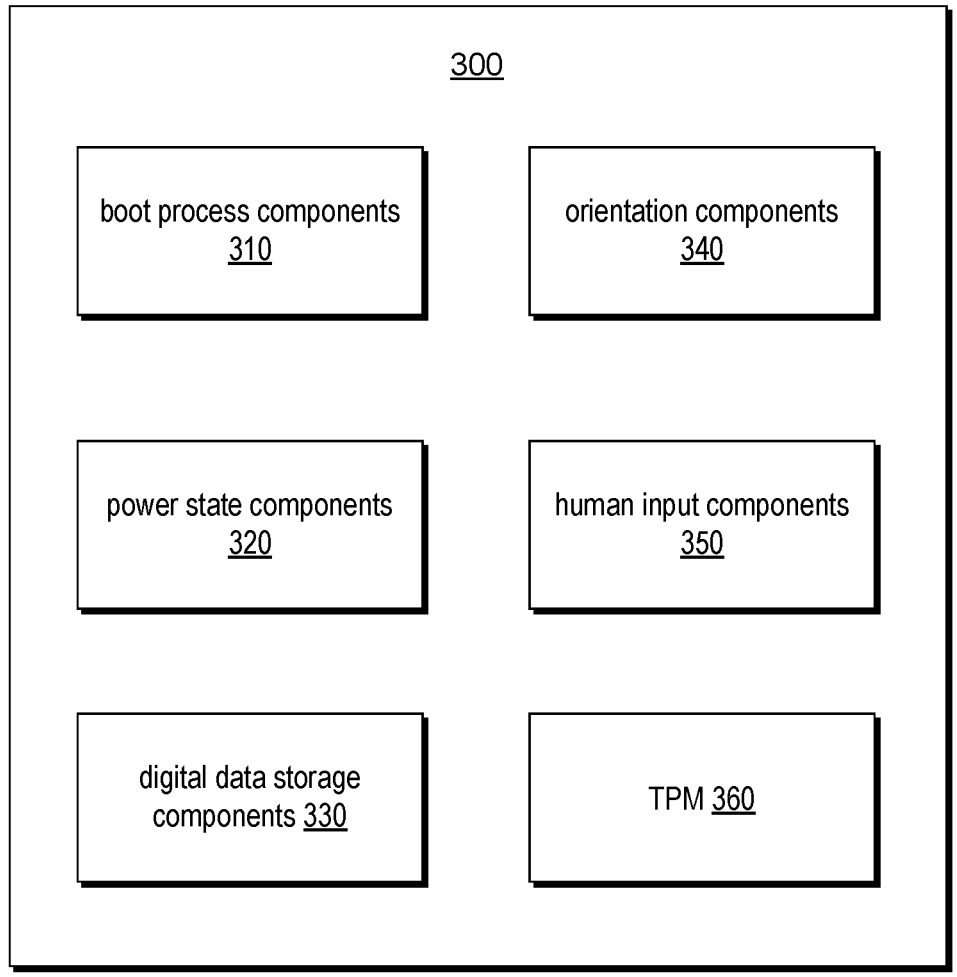
FIG. 3 is a diagram of various examples of components.

FIG. 3 shows examples of components 300 of a device where the components include boot process components 310, power state components 320, digital data storage components 330 (see, e.g., the drives 184 and 194 of FIG. 1, etc.), orientation components 340, human input components 350, and an optional TPM 360. As an example, a biometric input component can be a human input component. As an example, one or more of a home button, a keyboard, a touchpad, a touchscreen display, and a digitizer display can be a human input component.

As an example, a human input component may be inaccessible in one or more orientations and/or configurations of a device and/or an assembly. In such an example, the human input component may be a second human input component where a first human input component can be, for example, a biometric input component. In such an example, authentication data generated by the first human input component can be utilized to enable the second input component, for example, consider one or more of a home button surface, a keyboard surface, a touchpad surface, a touchscreen display surface a digitizer display surface, becoming accessible and enabled via a transitioning action or actions that can occur at least in part responsive to authentication of such authentication data. As to a human input component, accessible can be defined as accessible to human input via human touch, human manipulation of a stylus, etc. For example, a keyboard of a keyboard housing of a clamshell device can be accessible once the clamshell device is in an open orientation where a display housing is pivoted to an angle with respect to the keyboard housing that is sufficient for a human to use the keys of the keyboard for input (e.g., surfaces of the keys for touch-typing, etc.).

As an example, a method may utilize one or more of the components 300, for example, to transition a device from one state to another state. As an example, a method may operate to cause data of one or more of the digital data storage components 330 (see, e.g., the drives 184 and 194) to become inaccessible, effectively destroyed or destroyed. For example, inaccessibility may be via a power supply, via a power state, via locking in a closed-clamshell orientation, via bus disablement, via a boot process, etc. As to effective destruction of data, consider erasing one or more file system data structures (e.g., master file table (MFT), etc.), destroying a key utilized for decryption, etc. As to destruction, consider overwriting (e.g., formatting), one or more overwrites, etc.), electrical shock, thermal shock, physical shock, etc. As to electrical shock, a discharge from a charged capacitor may destroy a drive (e.g., via electricity, electromagnetic field, etc.). As to thermal shock, a resistive heating element or elements may be utilized to thermally damage a drive. As to physical shock, a pre-set spring-loaded hammer may be triggered to impact a portion of a drive. For example, consider a pre-set spring-loaded hammer as a hammer in a sleeve that can be released electronically and/or via another release mechanism such that the hammer travels a distance with an amount of kinetic energy to impact a platter (e.g., consider a ceramic platter, which may be a glass platter) or to impact flash memory circuitry (e.g., a NAND, NANDs, etc.). As an example, a drive may include a built-in fuse that can melt in response to an amount of current where the melting process destroys the drive or, for example, where the fuse is part of a release mechanism for a hammer. Such an approach may be a combined electrical and thermal approach or, for example, a combined electrical, thermal and mechanical approach. As an example, where a device includes the TPM 360 as a component, locking out or otherwise disabling the TPM can interfere with and/or prevent one or more state transitions and/or access to encrypted data as may be stored on one or more of the digital data storage components 330. As an example, consider a destruction component that can destroy a TPM via one or more of electrical, thermal or mechanical energy.

As to encryption, a TPM and/or an application (e.g., BITLOCKER, etc.) may be utilized to encrypt stored data. As an example, an application may operate in combination with a dongle, which may be a USB startup key that can start a device or, for example, resume a device from hibernation, etc. As an example, a combination of a TPM and an application may provide pre-startup integrity verification.

As an example, an application (e.g., BITLOCKER) can provide an option to lock a normal startup process until a user supplies a personal identification number (PIN) or inserts a removable device, such as a USB flash drive, that includes a startup key. Such additional security measures provide multifactor authentication (MFA) and assurance(s) that a device will not start or resume from hibernation until the correct PIN or startup key is presented.

As mentioned, various processes require power (e.g., electrical power from a battery, from a power connector, etc.) to operate. For example, a boot process as shown via the state diagram 200 of FIG. 2 demands power as indicated by the power state. As an example, where a device cannot be powered on, a boot process may be unable to be performed and, hence, the device can be secure, at least from establishing an OS environment (e.g., a host environment that can enable various components, access one or more drives, etc.).

Figure 4:
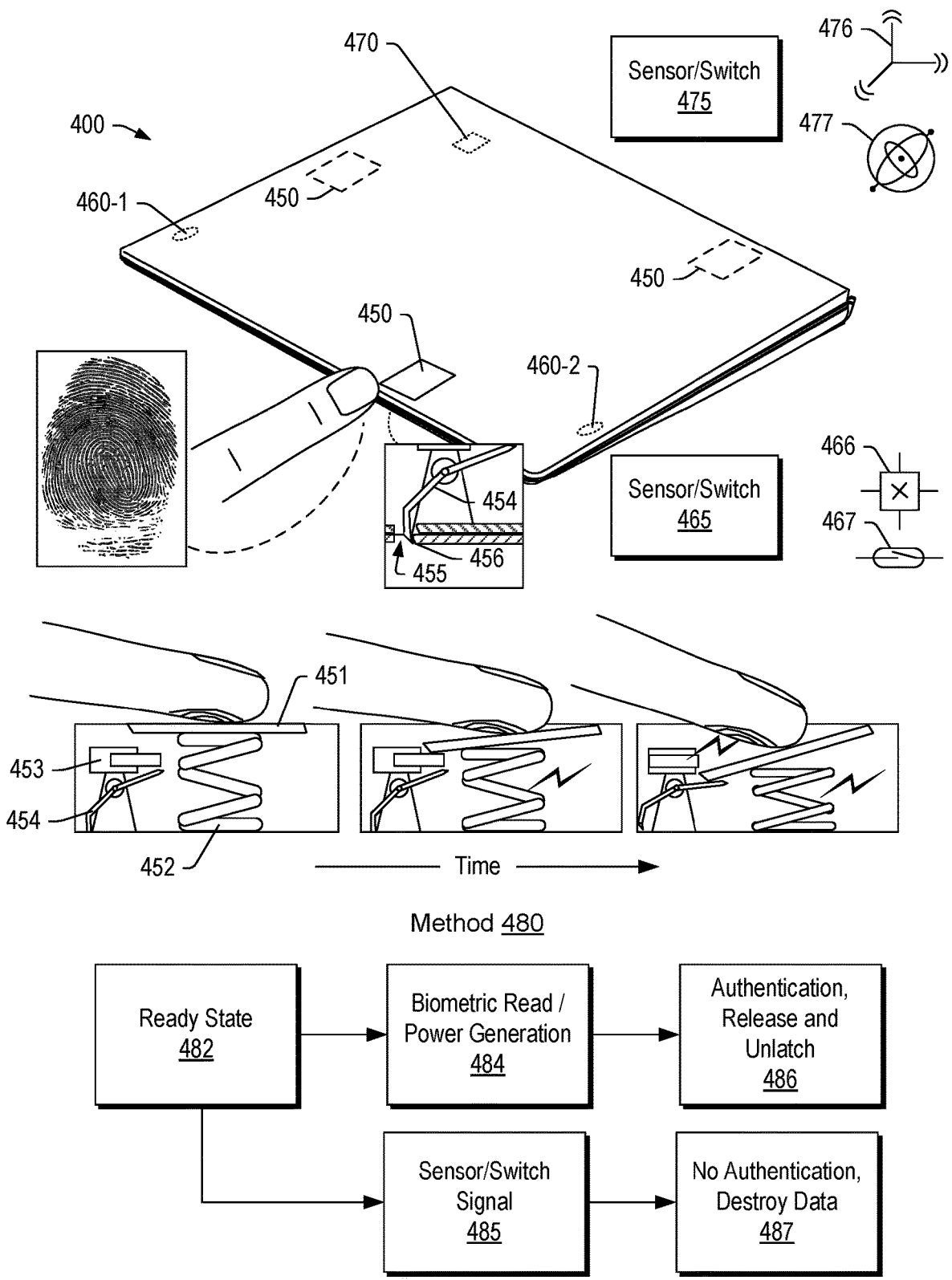
FIG. 4 is a series of diagrams of an example of a device, an example of a human input component and an example of a method.

FIG. 4 shows an example of a device 400 that includes a mechanically powered biometric input component 450, which may be at one or more positions on the device 400, some examples of positions being illustrated by dashed lines. In the example of FIG. 4, a user may place a finger on the biometric input component 450 and mechanically depress a surface of the biometric input component 450 to cause generation of electrical power, which can provide for analysis of a fingerprint of the finger, for example, for authentication of fingerprint and hence the user.

An example of the mechanically powered biometric input component 450 is illustrated in FIG. 4 as including a surface 451 that can generate fingerprint data, a spring element 452 that can be piezoelectric or operatively coupled to a piezoelectric element, a releasable stop 453 (e.g., a piston in a sleeve, etc.) and a latch 454. As shown, the releasable stop 453 can halt downward movement of the surface 451 and hence further compression of the spring element 452 where if authentication occurs for the fingerprint using at least in part energy generated by depression of the surface 451, the releasable stop 453 can be released such that the surface 451 can be further depressed to cause release of the latch 454 and optionally generation of additional energy, which may be, for example, stored in a storage circuit. As an example, the releasable stop 453 may be a cylinder in a sleeve that can be translated inwardly or outwardly responsive to electrical energy. For example, consider a non-powered locked state where supply of electrical energy can cause the cylinder to retract (e.g., consider electromagnetic field generation, etc.). While a cylinder is mentioned, a plate or other type of arrangement may be utilized.

As to the latch 454, it can include an end that extends from one housing to another housing, for example, into an opening of the other housing. In such an example, the latch 454 can be made of one or more types of materials such as, for example, one or more of polymeric, metallic, or ceramic materials. As an example, with reference to the device 100 of FIG. 1, the latch 454 can extend from the display housing 140 to the keyboard housing 120 where an end of the latch 454 may be received in an opening in the keyboard housing 120 or by another feature. As an example, the keyboard housing 120 can include a strike component that can be utilized to receive and/or contact an end of the latch 454. As an example, one or more release features, latch features, etc., of the biometric input component 450 may be magnetic and/or electromagnetic.

FIG. 4 shows an example arrangement where the latch 454 passes through openings 455 (e.g., one in a display housing and one in a keyboard housing) to contact a strike component 456. In such an example, release of the latch 454 can allow housings to be transitioned from a closed, clamshell orientation to an open orientation. As an example, the latch 454 may be a utilized as a tamper sensor. For example, if the device 400 is opened without release of the latch 454 via proper authentication, the latch 454 may become stressed or deformed, elastically or plastically. As an example, the latch 454 may include or be operatively coupled to a sensor that can detect such stress and/or deformation (e.g., consider a strain sensor, a position sensor, etc.). In response, the device 400 may set or initiate a protection process, which may aim to protect stored data. For example, if the device 400 is opened inappropriately in a manner sensed via the latch 454 and/or another sensor (e.g., a Hall sensor, a motion sensor, etc.), the device 400 can set a data erasure, a data destruction, etc., mechanism once power is supplied, for example, by an unauthorized user hitting the power button (see, e.g., the power button 121 of FIG. 1), etc. As explained with respect to FIG. 1, a device can include one or more types of drives (see, e.g., the drives 184 and 194), which may be subjected to a data protection process and/or data damaging process.

As an example, where a security lock (e.g., the latch 454, etc.) has been tampered with when a device is not powered on and if/when the device ever powers back on, the device can run a diagnostics check (e.g., a POST like process, etc.) and, as appropriate, recognize that the security lock has been tampered with such that the device can proceed with data protection, data deletion, etc. As an example, a drive can include one or more sensors, diagnostics, etc., that can detect whether the drive has been removed from a device. In such an example, the drive can upon receiving power via a different device commence data protection, data deletion, etc. For example, a controller of a drive can include firmware or other instructions or hardware circuitry that can cause the controller to take one or more data protection, data deletion, etc., actions. As an example, such an approach may be utilized by the same device where, for example, there is a risk that malware, spyware, etc., has been installed on the drive after removal. In such an example, once the drive is installed and the device powered on, the device and/or the drive (e.g., via a controller) may take one or more actions to assure that the adulterated drive does not compromise the device.

As an example, a biometric authentication method can proceed using mechanically generated energy, as generated locally at the time of execution of the biometric authentication method. As explained, the mechanically generated energy can be from a touch of a finger to a depressible surface that is operatively coupled to piezoelectric circuitry that generates electrical energy.

While the example of FIG. 4 includes an illustration of a latch 454 that may act to latch housings of the device 400 in a closed, clamshell orientation, as an example, the biometric input component 450 can be mechanically powered without including a mechanical latch.

FIG. 4 also shows examples of various sensors and/or switches 460-1, 460-2, 465, 466, 467, 470, 476 and 477, which may be a part or parts of the device 400. As an example, the sensor 460-1 and/or the sensor 460-2 may be lid sensors and/or switches. As an example, consider the sensor 466 as being a Hall sensor and the switch 467 as being a reed switch that can determine whether the device 400 is in a closed orientation or in an open orientation (e.g., not closed). As to the sensors and/or switches 476 and 477, these may include accelerometer circuitry and/or gyroscope circuitry (e.g., one or more accelerometers, one or more gyroscopes, etc.).

FIG. 4 also shows an example of a method 480, which can be bifurcated, depending at least in part on operation of one or more features of the device 400. As shown, the method 480 includes a ready state 482 where the biometric input component 450 may be ready for depression. The method 480 may proceed to a biometric read and power generation block 484 for biometric reading and power generating and then to an authentication, release and unlatch block 486 for authenticating biometric input, releasing a releasable stop and unlatching a latch. As an example, the method 480 may proceed differently depending on, for example, input from one or more sensors and/or switches per the sensor/switch signal block 485 for receiving one or more signals. In response, the method 480 may proceed to a no authentication and data destruction block 487, which may make data stored in one or more data storage devices of the device 400 inaccessible, effectively destroyed or destroyed. For example, given a latched device, where the device 400 is forced open or broken without authentication, one or more of the sensors and/or switches (e.g., or the latch) may provide signals of such tampering and trigger one or more mechanisms that can prevent a person from accessing a user's data.

As an example, a biometric input component can include or be operatively coupled to a piezoelectric circuit (e.g., piezoelectric circuitry) where, for example, an applied force of at least several newtons (N) may be utilized to generate electrical energy. As an example, consider applying force of approximately 3 N to 10 N (e.g., a force range equivalent to approximately 300 g to approximately 1 kg subjected to the acceleration of Earth's gravitational field).

As an example, a device can include a digitizer display such that input can be receiving through use of a stylus. In such an example, the digitizer display can include a digitizer panel that can be primarily utilized on a display side of a display housing of the device and that can be secondarily utilized on a back side of the display housing, which is a side opposite the display side. In such an example, a user may utilize a stylus to draw on the back side of the display housing where the drawing may be a gesture, a graphic, etc., that is utilized as a factor in an authentication process. For example, consider a portion of the back side of the display housing being known to a user where a user can sign her name on the back side of the display housing where digitizer circuitry digitizes the user's signature and compares it with stored biometric data to determine whether it is authentic, which can result in authentication. In such an example, a device may be sold with a sticker that indicates where the digitizer "window" exists on the back side of the display housing, which may be removed once the user knows the location. While a digitizer is mentioned as an example, a device can include a touch sensitive surface on a back side of a display housing, which may be utilized for touch input that can be utilized as a factor in an authentication process.

FIG. 5 shows an example of a device 500 that includes a biometric input component 550, which may include, for example, one or more features of the biometric input component 450 of the device 400 of FIG. 4. As an example, the device 500 can include one or more features of the device 400 of FIG. 4 and may be utilized to perform a method such as the method 480 of FIG. 4.

FIG. 5 also shows an example of a device 501 that can be a clamshell device that includes a flexible display that can be curved in one or more orientations such as a closed, clamshell orientation (left) and an open orientation (right). In such an example, a portion of the device 501 may be a keyboard portion and referred to as a keyboard housing and another portion of the device 501 may be a display portion and referred to as a display housing. For example, in the closed, clamshell orientation, a display portion is folded over a keyboard portion where the portions can be part of a main housing, which may include sub-housings (e.g., a keyboard housing and a display housing as sub-housings). In the example of FIG. 5, the device 501 can include a hinge region, which may be a region that includes a flexible display. Various types of biometric input components, sensors, switches, circuitry, etc., may be utilized with the device 501.

In FIG. 5, the biometric input component 550 is on an edge of a housing, which may be, for example, an edge of a display housing (e.g., an edge opposite a hinged end or back edge, which may be referred to as a front edge, a side edge, or a back edge). The biometric input component 550 can include a depressible surface that can be touched by a finger and pressed by a finger whereby piezoelectric circuitry can generate electrical energy that power authentication circuitry that can authenticate generated fingerprint data of the finger. For example, the depressible surface can be a fingerprint reader surface. As shown, the device 500 or the device 501 can include at least one biometric input component.

Figure 6:
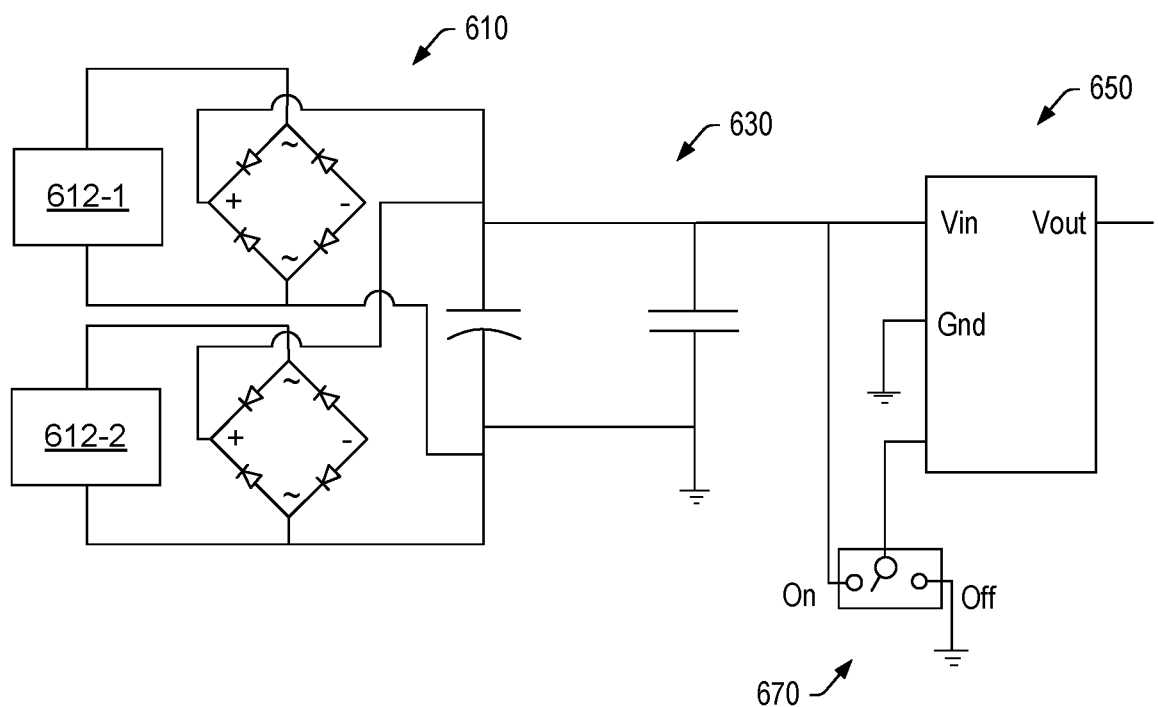
FIG. 6 is a diagram of examples of circuitry components.

FIG. 6 shows an example of circuitry 600 that includes one or more piezoelectric elements 612-1 and 612-2, bridge circuitry 610, power storage circuitry 630 and an optional integrated circuit 650. As shown, via one or more of the one or more piezoelectric elements 612-1 and 612-2, mechanical energy can be transformed into electrical energy that is made suitable for storage in the power storage circuitry 630 via the bridge circuitry 610. For example, the power storage circuitry 630 can include one or more capacitors. As to the optional integrated circuit 650, it may process an input voltage (Vin) to a desired output voltage (Vout) that may be, for example, suitable for powering one or more types of circuitry (e.g., release circuitry for a releasable stop, authentication circuitry, etc.). In the example of FIG. 6, the integrated circuit 650 itself may be powered by the supply of electrical energy thereto (see, e.g., Vin). As an example, the circuitry 600 can include a mechanical switch 670 that can turn one or more features on or off. In such an example, the power storage circuitry 630 may include stored power that becomes available to the integrated circuit 650 once the mechanical switch 670 is transitioned to an on position, which may occur, for example, upon depression of a depressible surface of a biometric input component.

An article by Cho et al., entitled "Design of optimized cantilever form of a piezoelectric energy harvesting system for a wireless remote switch", Sensors and Actuators A: Physical, 280 (2018) 340-349, is incorporated by reference herein. The article by Cho et al. describes use of Schottky diode rectifiers, for example, a semiconductor diode formed by the junction of a semiconductor with a metal, which can have a low forward voltage drop and a very fast switching action. In FIG. 6, the bridge circuitry 610 can include one or more rectifiers (e.g., Schottky diode rectifiers, etc.). Cho et al. also describes use of capacitors and an integrated circuit (TPS62122DRV, Texas Instruments), which can be utilized in circuitry such as the circuitry of FIG. 6.

As an example, a device can include a piezoelectric energy harvesting (PEH) system that can be part of a biometric input component and/or operatively coupled to a biometric input component. As an example, a device can include circuitry that can transmit a signal wirelessly to one or more receivers. For example, consider a biometric input component that can transmit biometric data wirelessly to a network where an authentication signal may be received in response to authentication of the biometric data. In such an example, the signal received in response may cause the device to transition to a state such as an operating system state as part of a boot process. As an example, a device may be utilized in a facility where a network is available for receiving generated authentication data (e.g., biometric data, etc.) and for transmitting a signal in response to successful authentication of the authentication data. Where the network is not available, the device may be limited in its operation. For example, the device may be inoperable or may not boot where the network is not available. As an example, consider a user pressing the surface 451 to cause generation of authentication data and electrical energy that can be utilized to transmit at least a portion of the authentication data and/or data based thereon to a network via wireless transmission circuitry where a signal can be generated via equipment operatively coupled to the network (e.g., one or more servers, etc.) that can be transmitted for receipt by wireless reception circuitry of the device. While wireless transmission and reception are mentioned, consider a wired and/or a hybrid method where, for example, a network connector of the device may be utilized to transmit and/or receive. In such an example, the surface 451 may cause generation of authentication data and electrical energy for transmission of at least a portion of the authentication data (or data based thereon) via a wired network connection. In such an example, where the authentication is successful, the wired network connection may provide a signal for booting the device and/or may provide access to a remote boot source (e.g., a remote OS as a source).

As an example, a biometric input component can include and/or be operatively coupled to circuitry that can provide for one or more aspects of a multi-factor authentication method. For example, in FIG. 4, the biometric input component 450 can transmit a code wirelessly to a user device such as a cell phone where the code may be utilized upon logon on the device 400, for example, to advance one or more states in the state diagram 200 of FIG. 2. In such an example, the code may be transmitted to the device 400 and/or stored in the biometric input component 450 such that the code can be compared to a code entered via the device 400 (e.g., via a keyboard of the device 400, a touchscreen of the device 400, etc.). As an example, the biometric input component 450 can transmit a code via BLUETOOTH circuitry to BLUETOOTH circuitry of a smartphone responsive to a user having a fingerprint authenticated using the biometric input component 450. In such an example, the state diagram 200 of FIG. 2 may operate via two-factor authentication where a first factor is biometric and where the second factor is a code transmitted wirelessly to another device that is in possession of the holder of the biometric (e.g., a fingerprint, a retina image, an iris image, a facial image, etc.). As an example, a multi-factor approach may utilize a combination of one or more power state transitions and one or more boot process transitions. For example, consider a biometric transitioning to a power on state of a device where the device, as powered on, requires input of a code to proceed to load an operating system (e.g., to establish an operating system environment).

While an example above mentions BLUETOOTH circuitry, other examples may include WIFI circuitry, near-infrared circuitry, or one or more other electro and/or magnetic based communication technologies.

As an example, a biometric input component can include or be operatively coupled to piezoelectric circuitry that can generate electrical energy responsive to use of the biometric input component. As illustrated in the example of FIG. 4, a depressible surface may be depressible further to release a latch where such depression is possible after authentication. In such an example, power storage circuitry may be charged, for example, after authentication for purposes of a subsequent authentication.

FIG. 7 shows an example of a device 700 that includes a biometric input component 750, which may be at one or more positions on the device 700, some examples of positions being illustrated by dashed lines, including outwardly facing positions that can include a front edge position. In the example of FIG. 7, biometric input may occur when the device 700 is in a closed, clamshell orientation. In the example of FIG. 7, an image of a user's eye may be captured by the biometric input component 750, which can provide for authentication of the eye and hence the user. As an example, the biometric input component 750 can include a camera (e.g., a digital camera). As an example, the biometric input component 750 can be part of a module that includes multiple cameras such as a camera facing outwardly and a camera facing inwardly in the orientation of the device 700 as shown in FIG. 7 (see also the camera 145 of the device 100 of FIG. 1). In such an example, one camera can have a field of view that is directed outwardly from a back side of a display housing while another camera can have a field of view that is directed outwardly from a display side of a display housing, which in a closed, clamshell orientation may be considered as being directed inwardly.

As an example, a biometric authentication method can proceed using stored energy, as may be stored in one or more batteries, capacitors, etc.

As an example, the device 700 may include a latch that may act to latch housings of the device 700 in a closed, clamshell orientation.

FIG. 7 also shows examples of various sensors and/or switches 760-1, 760-2, 765, 766, 767, 770, 776 and 777, which may be a part or parts of the device 700. As an example, the sensor 760-1 and/or the sensor 760-2 may be lid sensors and/or switches. As an example, consider the sensor 766 as being a Hall sensor and the switch 767 as being a reed switch that can determine whether the device 700 is in a closed orientation or in an open orientation (e.g., not closed). As to the sensors and/or switches 776 and 777, these may include accelerometer circuitry and/or gyroscope circuitry.

FIG. 7 also shows an example of a method 780, which can be bifurcated, depending at least in part on operation of one or more features of the device 700. As shown, the method 780 includes a ready state 782 where the biometric input component 750 for reading an eye (e.g., capturing an image of an eye, etc.). The method 780 may proceed to a biometric read 784 for biometric reading and then to an authentication and unlatch block 786 for authenticating biometric input and unlatching a latch. As an example, the method 780 may proceed differently depending on, for example, input from one or more sensors and/or switches per the sensor/switch signal block 785 for receiving one or more signals. In response, the method 780 may proceed to a no authentication and data destruction block 787, which may make data stored in one or more data storage devices of the device 700 inaccessible, effectively destroyed or destroyed. For example, given a latched device, where the device 700 is forced open or broken without authentication, one or more of the sensors and/or switched (e.g., or the latch) may provide signals of such tampering and trigger one or more mechanisms that can prevent a person from accessing a user's data.

Figure 8:
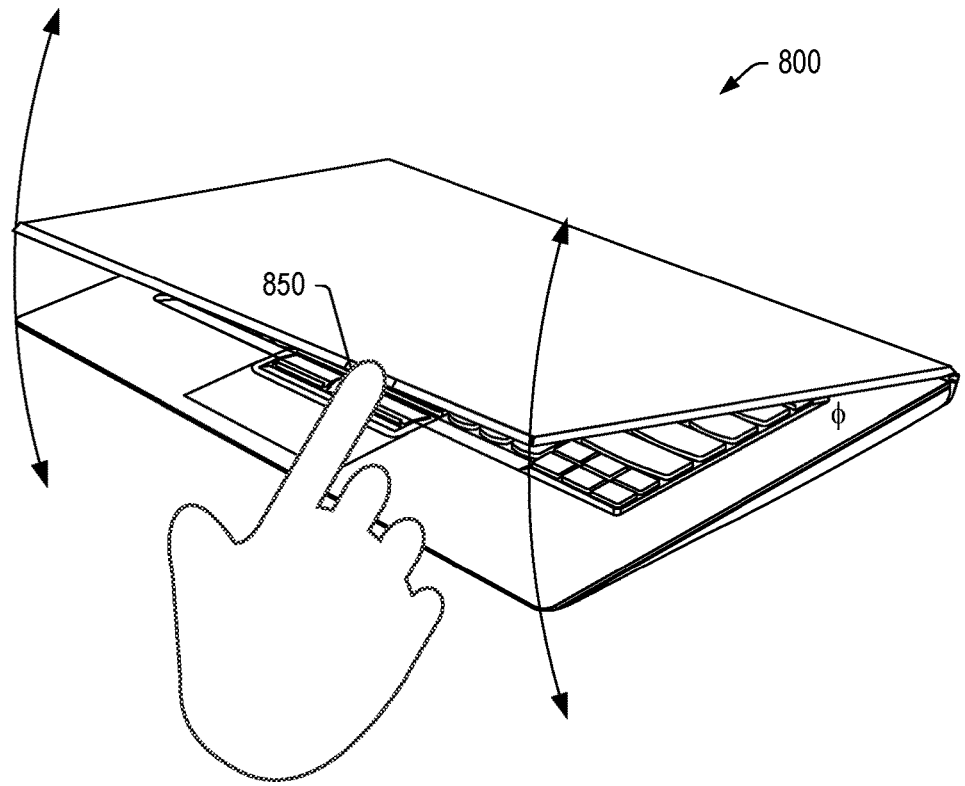
FIG. 8 is a series of diagrams of an example of a device and an example of a graphical user interface that can be rendered to a display of the device.

FIG. 8 shows an example of a device 800 that includes a biometric input component 850 that can be positioned such that it is touched during transitioning of the device 800 from a closed orientation to an open orientation and/or during transitioning of the device 800 from an open orientation to a closed orientation. As an example, a transition can be for transitioning to an open orientation that corresponds to an angle (see, e.g., the angle ϕ of the device 100 of FIG. 1). As an example, such an angle may be sufficient for a user to utilize a keyboard, for example, for touch-typing. For example, such an angle may be an angle greater than approximately 45 degrees; where a closed, clamshell orientation is defined by an angle of 0 degrees. FIG. 8 also shows an example of a graphical user interface 890 (GUI 890).

In the example of FIG. 8, an authenticate while opening (AWO) process may be performed such that a user does not have to make any additional touches as may be required for an opening process and then a separate touching of a fingerprint reader for a fingerprint reader process. An authenticate while opening approach can be efficient and enhance a user's experience.

In the example of FIG. 8, one or more sensors can be utilized to determine a position of one or more housings of the device 800. For example, consider a hinge that can determine orientation of one portion with respect to another such as, for example, a pin in a barrel, a leaf with respect to another leaf, etc. As an example, one or more housings can include one or more of an accelerometer, a gyroscope, etc. (see, e.g., the sensor/switch 775 of FIG. 7, etc.). For example, consider a display housing that includes an accelerometer that can track orientation of the display housing with respect to a keyboard housing during an opening process and/or during a closing process where an angle defined by the two housings changes. In such an example, both housings may include accelerometers where signals (e.g., data) therefrom may be utilized to determine how housings are oriented (e.g., including angle therebetween, etc.), moving with respect to time, etc. As an example, authentication data may be generated for one or more angles where the authentication data may be stored, analyzed, etc., in an angle dependent manner. As an example, authentication data may be stored with respect to time and optionally with respect to angle (e.g., as one or more data structures in memory, etc.). As an example, authentication data may be stored in combination with accelerometer and/or gyroscope data (e.g., as one or more data structures in memory, etc.). As an example, one or more of time data, accelerometer data (e.g., and/or gyroscope data), and angle data may be utilized in an authentication process, optionally where a user has a known (e.g., stored) signature of opening and/or closing a clamshell device such as the device 800 of FIG. 8. In such an example, where a device is opened to an angle less than a predetermined angle (e.g. 45 degrees, etc.), which may be less than a user's regular open angle, an authentication process may be halted; noting that authentication data may be generated, for example, to determine whether the user is opening the device or an unauthorized individual is opening the device (e.g., attempting to understand how a biometric input component of the device operates, etc.). As an example, an unauthorized individual's biometric data may be stored and, for example, transmitted via a network for analysis, future use, etc. As an example, a device may store information as to a user's regular open angle, a user's time to perform a transition from closed to open (e.g., or open to closed), a user's acceleration of a housing during a transition, etc. As to time, consider a time limit that if a transition does not occur within a time period or time window, an authentication process may fail. As to acceleration, consider a peak acceleration, an average acceleration, etc., that does not fall within a range of an authorized user such that an authentication process may fail.

As an example, authentication may occur upon closing where, if a user utilizes the biometric input component 850 to transition the device 800 from an open orientation to the closed orientation, an authentication process may trigger one or more actions, which may optionally be user selectable (e.g., via a GUI or GUIs). For example, if the user desires to transition the device 800 without having to reauthenticate upon transitioning from closed to open, the user may utilize the biometric input component 850 upon transitioning from open to closed, which may indicate that the user was the individual that performed the transition. Given the assurance that the user transitioned the device 800 to closed, the user may reopen the device 800 without having to wait for authentication, without having to touch the biometric input component 850, etc. As an example, a device can include circuitry for one or more of an authenticate while opening (AWO) process and an authenticate while closing (AWC) process.

As an example, consider a use case scenario where a user intends another individual to open and see and/or use the device 800 without that user having to be authenticated. In such an example, the authenticated user does not have to carry around or move the device 800 in an open orientation to move it (e.g., bring it) to the other individual.

As another example, where a user is in a secure location, the user may close the device 800 in a manner that does not require re-authentication upon opening. For example, use of the biometric input component 850 for closing may indicate that the user is in a secure location or, for example, a user setting may be selected such that closing using the biometric input component 850 indicates that the user is not in a secure setting; whereas, closing without use of the biometric input component 850 indicates that the user is in a secure setting where opening may occur without use of the biometric input component 850.

The example GUI 890 shows various examples of some options that can be selectable by a user to control what happens for opening without authenticating, closing without authenticating, authenticating on opening and/or authenticating on closing. In the example of FIG. 8, the user has selected "do nothing" for opening without authenticating and has selected "enable tamper alarm" for closing without authenticating along with "power down" (e.g., power off) and a requirement that authentication is required for powering on (e.g., after power down). As to authenticating on opening, the user has selected enter OS, which is to establish an operating system environment (see, e.g., FIG. 2). As to authenticating on closing, the user has selected allow opening without authentication, which, as explained, can be a use case scenario where the device 800 "knows" that the user transitioned the device 800 to a closed, clamshell orientation and not someone else. Such a "secure" closure can be an indicator that the user did not want to have the device 800 in the closing without authenticating state (see, e.g., selections in the GUI 890) but that the user wanted the device 800 to be in a different state, for example, to allow the device 800 to be transitioned from the closed, clamshell orientation to an open orientation without having to re-authenticate (see also, e.g., "do nothing"). As mentioned, such a scenario can be for transporting the device 800, moving the device 800, etc., where such transport or movement may be brief but in a manner where the user does not want to damage the device 800 and/or where the user does not want someone else to see what may be rendered to the display of the device 800 while being transported or moved. For example, consider a meeting at a table where a user authenticates on closing and carries the device 800 to a person on the other side of the table where the device 800 can be transitioned to an open orientation such that the person can see what is rendered to the display of the device 800. The user can then cause the device 800 to perform another authenticating while closing operation such that the user can return to his seat and re-open the device 800, again, without having to re-authenticate.

As indicated by the GUI 890, the opening without authenticating action can be "do nothing", which may be linked to the authenticating on closing, which allows for opening without authenticating, which may also be a "do nothing" non-action such that information rendered to the display of the device 800 remains rendered to the display.

Figure 9:
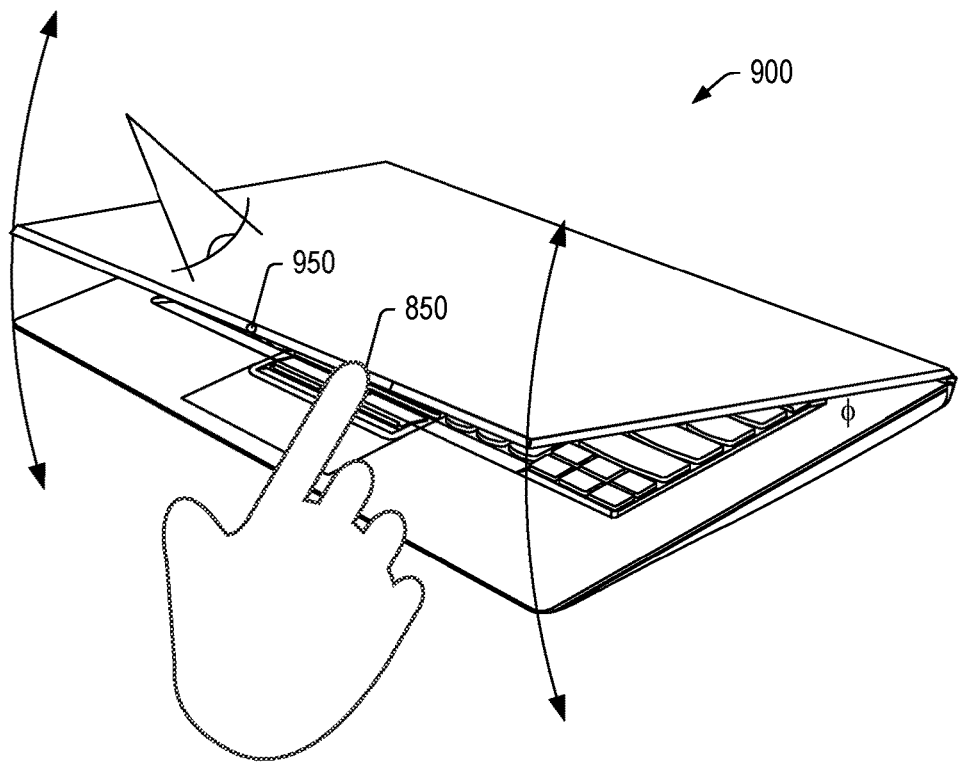
FIG. 9 is a series of diagrams of an example of a device and an example of a graphical user interface that can be rendered to a display of the device.

FIG. 9 shows an example of a device 900 that includes the biometric input component 850 and another biometric input component 950, which may be, for example, a camera (e.g., a front edge camera, a top surface camera with a field of view (e.g., via a lens and/or other optical element) that can capture an image or images of an individual opening the device 900, etc.). In such an example, one or both of the biometric input components 850 and 950 may be utilized for one or more purposes (e.g., authenticate while opening, authenticate while closing, etc.). As an example, a device can include module that can include a front facing camera and a back facing camera or a front facing camera and a front edge camera. As an example, a clamshell device can include one or more optical elements that provide a field of view to a camera where the field of view can capture one or more images of an individual as the individual transitions the clamshell device from closed to open and/or from open to closed.

FIG. 9 also shows an example of a graphical user interface 990 (GUI 990), which includes various fields for entry or selection of one or more actions and/or one or more non-actions for the biometric input component 850 and for the biometric input component 950 (see, e.g., "options" menu dropdown graphical controls). In such an example, logic and include if-then logic where a combination of the biometric inputs may optionally be utilized. For example, consider fingerprint and facial recognition being required on authenticate on opening for purposes of transitioning a boot process (see, e.g., the state diagram 200 of FIG. 2). Other examples may include fingerprint and ocular recognition; fingerprint, facial and ocular recognition; etc.

As an example, a device can utilize one type of biometric or biometric combination for a user and another type of biometric or biometric combination for an administrator or other individual. For example, consider a user being able to logon using the biometric input component 850 with a fingerprint while an administrator requires use of the biometric input components 850 and 950. In such an example, the administrator can have privileges beyond those of the user. In such an example, the device 900 may be a corporate computing device that is managed and maintained by an administrator for use by a user, which may be a different employee of the corporation, which has a restricted ability to manage and/or maintain the device 900. As an example, the GUI 990 of FIG. 9 may be restricted and renderable only when both fingerprint and image recognition authentications occur. As an example, the GUI 990 may be managed by an administrator (e.g., restricted as an administrator privilege).

As an example, the device 400 of FIG. 4, the device 700 of FIG. 7, the device 800 of FIG. 8 or the device 900 of FIG. 9 may be configured with a flexible display such as the device 501 of FIG. 5. As an example, the device 501 of FIG. 5 may include circuitry that can be configured via one or more of the GUIs 890 and 990, for example, to provide for one or more actions as to an authenticate while opening (AWO) process and/or to provide for one or more actions as to an authenticate while closing (AWC) process.

Figure 10:
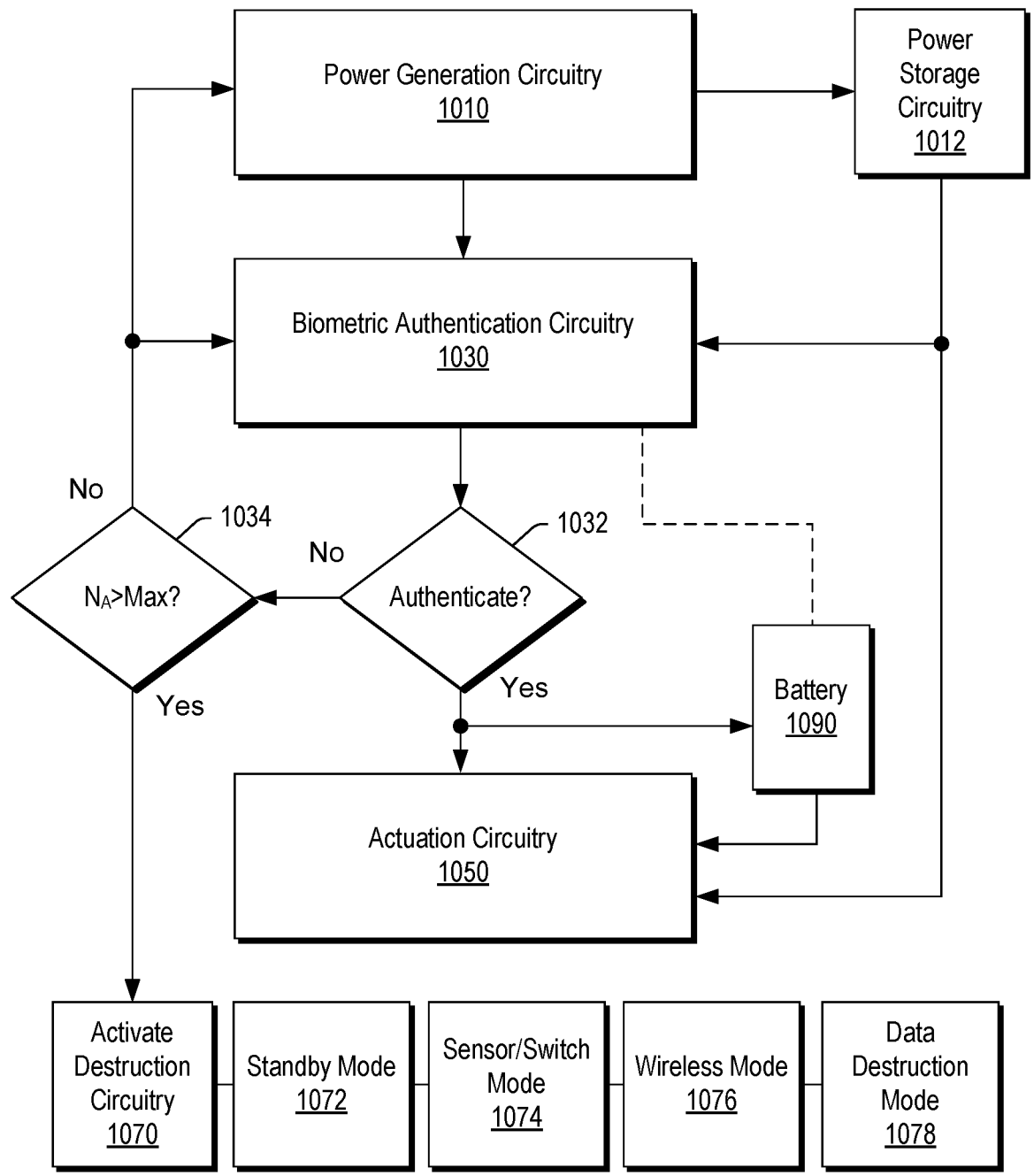
FIG. 10 is an example of a method.

FIG. 10 shows an example of a system and method 1000 that includes a power generation circuitry block 1010, a power storage circuitry block 1012, a biometric authentication circuitry block 1030, an authentication circuitry decision block 1032, a number of attempts decision block 1034, an actuation circuitry block 1050, an activation of destruction circuitry block 1070 and a battery block 1090. As shown, the activation of destruction circuitry block 1070 can include one or more additional blocks such as, for example, a standby mode block 1072, a sensor/switch mode block 1074, a wireless mode block 1076 and a data destruction mode block 1078.

As shown in FIG. 10, a method can proceed from the block 1010 to the block 1012 and/or the block 1030 where a positive decision ("Yes") of the block 1032 can result in implementation of the block 1050 and the block 1090 (e.g., utilization of battery power); whereas, a negative decision ("No") of the block 1032 can result in implementation of the decision block 1034, which can decide that a re-attempt is permissible ("No" branch) or that the method is to implement the block 1070 ("Yes" branch). In such an example, where a number of attempts ($N_A$) exceeds a maximum number of allowed attempts to authenticate, a method can take one or more protective actions (e.g., per one or more of the blocks 1070, 1072, 1074, 1076, and 1078).

As an example, for an authenticate while opening (AWO) process or an authenticate while closing (AWC) process of a device, an authorized user may understand that the device is to be transitioned from closed to open or open to closed and that to make another attempt, the device is to be in its appropriate starting state (starting orientation). Where an unauthorized user is unaware of the transitioning requirement of a device for AWO and/or AWC and attempts to use a biometric input component to make another attempt without returning the device its starting state, the attempt without returning to the starting state may be utilized as an indicator of tampering, which may cause one or more actions to be taken (see, e.g., the blocks 1070, 1072, 1074, 1076, and 1078, etc.). For example, a method can include a decision block that decides whether a device has been returned to a starting state before another attempt is made (e.g., consider a decision block before and/or after the decision block 1034 in FIG. 10).

Figure 11:
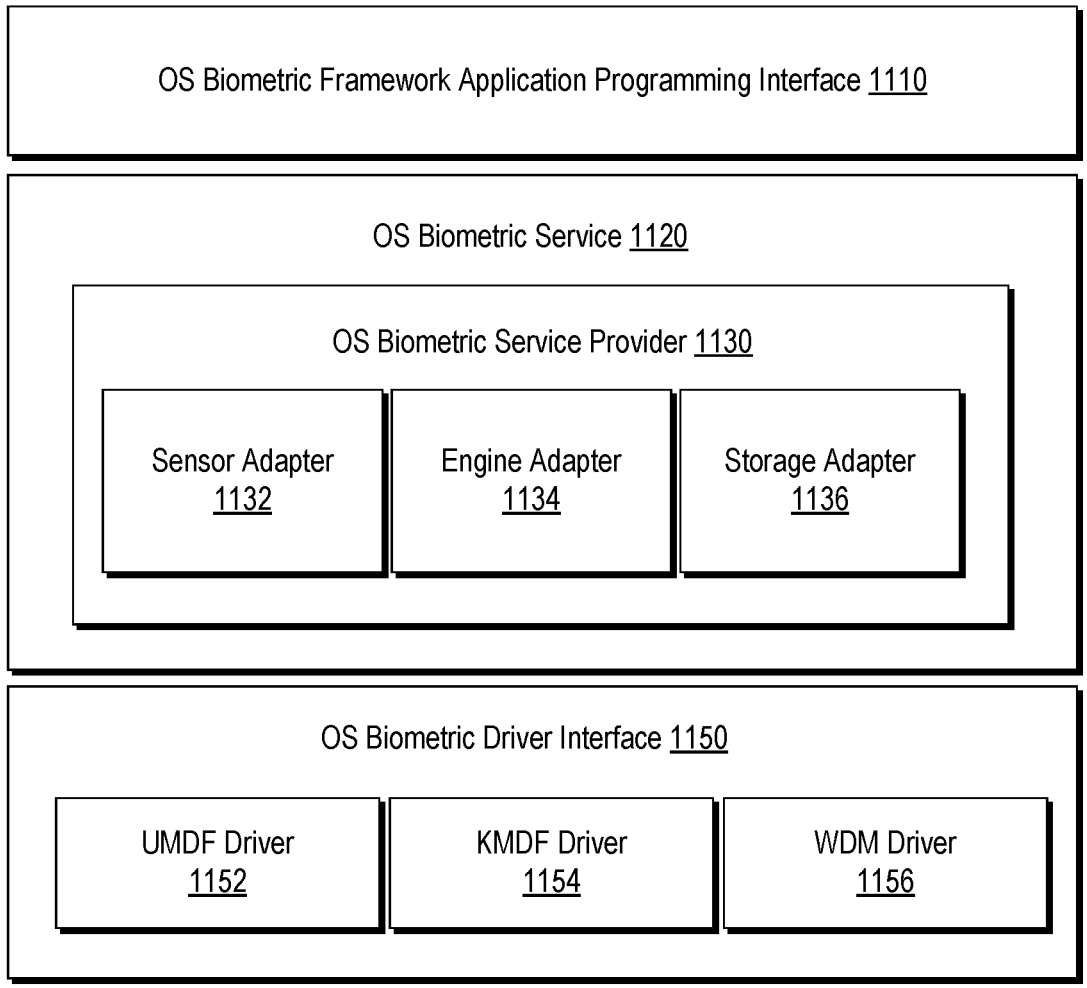
FIG. 11 is a diagram of an example of a biometric framework architecture.

FIG. 11 shows an example of a biometric framework architecture 1100 that includes various features or components, including, for example, an application programming interface (API) 1110, a service 1120, a service provider 1130, and a driver interface 1150. As shown, the service provider 1130 can include a sensor adapter 1132, an engine adapter 1134 and a storage adapter 1136. As shown, the driver interface 1150 can include a user-mode driver framework (UMDF) driver 1152, a kernel-mode driver framework (KMDF) driver 1154 and/or a WINDOWS driver model (WDM) driver. A biometric framework may include one or more of the features or components that can operatively couple to a fingerprint reader or fingerprint readers.

The sensor adapter 1132 can perform sample-capture operations (e.g., live scan fingerprint reader data acquisition). The engine adapter 1134 can perform processing including, for example, one or more of data normalization, feature extraction, and biometric template generation. As an example, the engine adapter 1134 may match biometric data to template(s) during enrollment, identification, and/or verification operations. The storage adapter 1136 can store, manage, and retrieve one or more templates.

As an example, an application may extend a biometric framework by providing one or more management capabilities and/or enabling one or more additional scenarios, including enrollment experiences, Web single-sign-on, and management of proprietary attributes of a fingerprint reader. Such an application may be, for example, an application executable via a local OS environment, executable via a remote computing device, etc.

As an example, a framework such as the framework 1100 may be utilized for purposes of biometric authentication of a biometric that may be other than a fingerprint (e.g., consider an eye biometric, a face biometric, another type of hand biometric, etc.). As an example, a framework may include components for multiple types of biometrics.

As an example, a method can operate to physically lock a clamshell device or a foldable device (e.g., a single flexible display device, etc.) that cannot be unlocked without authorization or authentication using an unlocking technology such as retina scan, fingerprint ID, gesture swiping, pin, etc. As an example, a clamshell type of device may be physically locked from opening until an authentication process is completed. Such an approach may provide, in addition to security benefits, prevention of accidental opening accidentally and protection of a display from potential wear or damage. The same benefits may apply to one or more other components such as the keyboard or another display(s) that may part of the clamshell device.

As an example, in terms of security, a clamshell device may go on lockdown if the device is tampered with (e.g., locking mechanism is broken or damaged, a sensor and/or a switch provides a signal indicative of tampering, etc.). As an example, lockdown can include securing files where, for example, a display remains in either a verification mode or is blank (e.g., to protect important user information).

As an example, a clamshell device can be closed and locked where, once locked, the device cannot be physically opened until an authentication process has been performed such as a unique finger or stylus gesture (e.g., swipe, scribble, etc.) across a back side of a display housing. In such an example, once this gesture has been completed, the device can unlock and the user may be able to see their content immediately or go through another verification screen, as desired. As mentioned, a display housing may include digitizer circuitry or other sensing circuitry that allows for human input via a back side, an edge, etc., of a display housing. As mentioned, an input area may be smaller than a total area of a back side or an edge of a display housing and, for example, may be an input area that is not marked yet known to an authorized user.

As an example, one or more notifications and/or additional security measures may be actuated where a latch mechanism is bypassed/broken. As an example, consider a multifactor authentication (e.g., 2FA, etc.), a hard disk wipe, an enabling of a location service, etc.

As an example, a failure to authenticate and/or sensing of tampering of a device may activate circuitry such as audio circuitry, display circuitry, GPS circuitry, WIFI circuitry, SIM circuitry, etc. For example, audio circuitry may cause the device to play a sound at a maximum volume, display circuitry may cause the device to prevent rendering of information to a display or to render a message to a display (e.g., an emergency number, a warning, etc.), GPS circuitry may provide GPS coordinates that can be transmitted to one or more devices via wireless circuitry such as WIFI circuitry, SIM circuitry, etc., and wireless circuitry may be utilized to transmit one or more notifications as to the status of the device (e.g., to a phone, an email, a service, etc.).

As an example, a failure to authenticate and/or sensing of tampering of a device may activate an application such as the "Find My" application (Apple Inc., Cupertino, Calif.), which can cause, for example, playing of a sound, flashing of a screen or entry into a "lost mode" that flags the device as lost or stolen, which may allow a user to lock the device with a passcode, entry to an erase mode that erases content and settings.

As an example, an accessory "lock shield" may be placed on a tablet, a clamshell or other mobile device that has functionality of physically locking the device.

Figure 12:
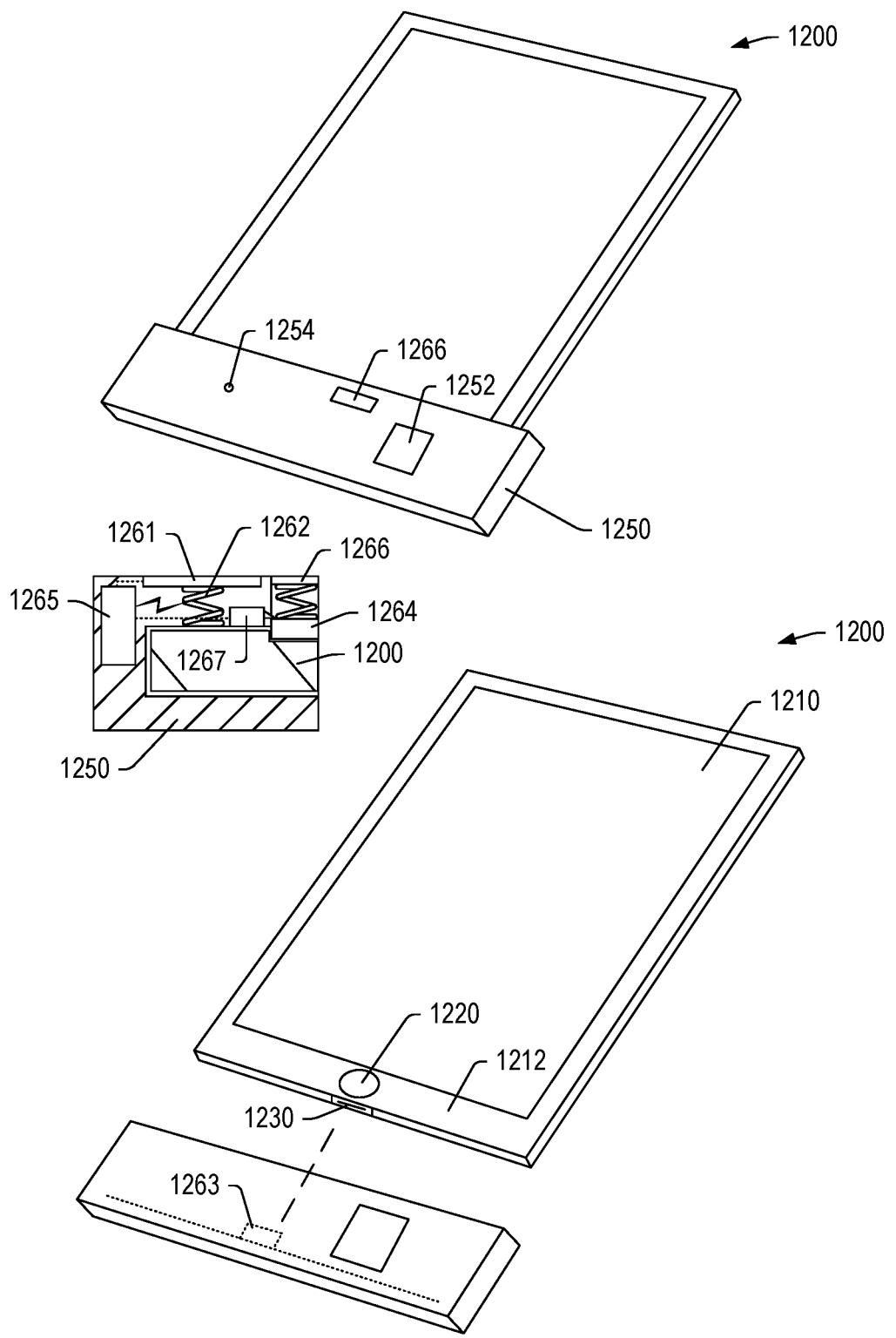
FIG. 12 is a series of diagram of an example of a device and an example of a lock shield that can be operatively coupled to the device.

FIG. 12 shows an example of a device 1200 and a lock shield 1250 that can include one or more biometric input components 1252 and 1254, for example, consider a fingerprint reader and a camera (e.g., for eye, facial, or other image recognition).

As shown, the device 1200 can be a tablet device (a tablet format device) that includes a display 1210 and a home button 1220, which itself may be a biometric input device. The device 1200 may further include a connector 1230, which may be a proprietary connector, a USB type of connector, or other type of data and/or power connector.

As an example, the lock shield 1250 can be self-powered and/or powered via the device 1200, for example, via a connector 1263 mating with the connector 1230. As to self-power, consider piezoelectric circuitry, one or more batteries, one or more solar cells, etc. In the example of FIG. 12, the lock shield 1250 can include a depressible surface 1261 for biometric input (see, e.g., the biometric input component 1252), piezoelectric circuitry 1262 for power generation, a latch 1264 for locking the lock shield 1250 onto the device 1200, authentication circuitry 1265 that can be powered via the piezoelectric circuitry 1262 (e.g., directly and/or indirectly), a locking button 1266 that actuates the latch 1264, and a releasable stop 1267 that can be transitioned from a stop state (e.g., extended) to a non-stop state (e.g., retracted) such that the latch 1264 can be unlatched. For example, the latch 1264 can include a spring that is in a stretched state such that upon release of the releasable stop 1267, the latch 1264 translates away from the device 1200 (e.g., from an edge between the display 1210 and a border region 1212. Where a user re-installs the lock shield 1260, the user may depress the locking button 1266 such that the latch 1264 is reset and held in place by the releasable stop 1267, which may include a chamfered component that translates responsive to contact with a component of the latch 1264 and then sets to secure that component of the latch 1264, which, as mentioned, may be set adjacent to an edge of the device 1200.

As an example, the lock shield 1250 may be utilized in addition to and/or as an alternative to a biometric or other input component of the device 1200. For example, where the home button 1220 is a fingerprint reader, one or more of the biometric input components 1252 and 1254 may be substitutes, which may optionally interact with the device 1200 via mating of the connectors 1230 and 1263 or, for example, in one or more other manners (e.g., via wire and/or wirelessly).

While the lock shield 1250 is shown in the example of FIG. 12 as being configured for a tablet device, such a lock shield may be configured for a clamshell device where, for example, the lock shield maintains the clamshell device in a closed, clamshell orientation. For example, such a lock shield may be a clip that clips onto a clamshell device when it is in a closed, clamshell orientation.

FIG. 13 shows an example of a method 1300 that includes a commencement block 1310 for commencing generation of authentication data using a first human input component operatively coupled to a device, where the device includes a processor, memory accessible to the processor, a display operatively coupled to the processor, and a second human input component that includes an input surface, and where the input surface is inaccessible at the time of commencing generation of the authentication data; and authentication block 1330 for authenticating the authentication data; and a transition block 1350 for, responsive to the authentication, transitioning the device to a state where the input surface of the second human input component is accessible and enabled for input.

In the example of FIG. 1, the keyboard 124 of the keyboard housing 120 can be a second human input component and/or the display 144 can be a touchscreen display that can be a second human input component. FIG. 1 also shows the touchpad 123 and the joystick 127, each of which may be second human input components.

In the example of FIG. 4, the biometric input component 450 can be a first human input component. In the example of FIG. 5, the biometric input component 550 can be a first human input component. In the example of FIG. 7, the biometric input component 750 can be a first human input component. In the example of FIG. 8, the biometric input component 850 can be a first human input component. In the example of FIG. 9, one or more of the biometric input components 850 and 950 can be a first human input component. In the example of FIG. 12, one or more of the biometric input components 1252 and 1254 can be a first human input component.

As an example, a method can include commencing generation of authentication data using a first human input component operatively coupled to a device, where the device includes a processor, memory accessible to the processor, a display operatively coupled to the processor, and a second human input component that includes an input surface, and where the input surface is inaccessible at the time of commencing generation of the authentication data; authenticating the authentication data; and, responsive to the authenticating, transitioning the device to a state where the input surface of the second human input component is accessible and enabled for input. In such an example, the second human input component can be a home button. For example, consider a home button of a mobile device (e.g., a tablet, a smartphone, etc.) and/or, for example, consider a button or other human input component that can operate as a connected standby (CS) actuation component (e.g., actuatable to provide an instant on and instant off user experience). As an example, the first human input component can be utilized to effectuate an instant on user experience subject to authentication.

As an example, a second human input component can be a keyboard. For example, consider a keyboard of a keyboard housing of a clamshell device, which can be inaccessible in a closed, clamshell orientation of the clamshell device. In such an example, circuitry disposed in a display housing can generate authentication data via a biometric reader while the display housing is moved from a closed orientation to an open orientation where, upon authentication of the authentication data, the keyboard can be in an accessible and enabled state. In such an example, the circuitry can include, for example, fingerprint circuitry, image circuitry, etc. For example, consider scanning a user's face, a user's eye or eyes, etc., using image circuitry while moving a display housing about a hinge or hinges that couple the display housing to a keyboard housing. In such an example, the image circuitry may capture one or more images where, for example, a first image may be utilized to improve capture and/or analysis of a subsequent image. For example, consider a first image of a face and a second image as being zoomed-in on one or more eyes of the face; noting that the image circuitry (e.g., a camera) can be moving along an arcuate trajectory. As an example, image circuitry may capture a series of images and select one or more of the images as "best" images for purposes of image recognition (e.g., generation of biometric authentication data). For example, an edge of a display housing may move from approximately horizontal (e.g., zero degrees) to approximately vertical (e.g., 90 degrees) where at various angles a camera on the edge of the display housing can capture an image of a user's face, including, for example, one or more of the user's eyes and/or one or more other features. As an example, a method can include capturing or selecting a best image or several best images for generating authentication data. As an example, circuitry may generate authentication data as time series data and/or as angle series data, for example, consider authentication data organized with respect to time and/or angles formed between a keyboard housing and a display housing of a clamshell device.

As an example, where an edge of a display housing includes a fingerprint reader, the fingerprint reader can capture or select "best" data while the finger of a user is in contact with the fingerprint reader during an opening transition of a clamshell device form a closed, clamshell orientation to an open orientation. In such an example, the angles at which the finger contacts the fingerprint reader may change somewhat such that authentication data generated may differ to some extent during a transition from horizontal to vertical and, for example, beyond vertical. In such an example, a time series and/or an angle series of authentication data may be generated. For example, consider fingerprint data generated as authentication data organized with respect to time and/or angles formed between a keyboard housing and a display housing of a clamshell device.

As an example, a method can include requiring re-authenticating and, prior to re-authentication, responsive to receipt of one or more signals indicative of tampering, preventing access to data stored in a data storage component of a device. For example, consider a failed authentication attempted by an unauthorized individual where a re-authentication is required. In such an example, the unauthorized individual may become frustrated by an inability to authenticate or otherwise decide to tamper with the device. In such an example, the device may detect tampering and set or initiate one or more actions to protect data, destroy data, etc.

As an example, a first human input component may be detachable from a device to make a second human input component accessible. For example, consider the lock shield 1250 of FIG. 12 (e.g., a security lock, etc.), which includes one or more human input components that can be detachable from the device 1200 to make the home button 1220 accessible. As shown in the example of FIG. 12, biometric input components 1252 and 1254 can be human input components.

As an example, a first human input component can be a fingerprint reader where authentication data include fingerprint data. As an example, a first human input component can be a camera where authentication data include image recognition data (e.g., eye, face, etc.).

As an example, a device can be a clamshell device where the clamshell device can be in a closed, clamshell orientation at a time of commencing generation of authentication data. In such an example, the device can be in an open orientation at the time of the authenticating. In such an example, in the open orientation, an input surface of a second human input component can be accessible and disabled until the authenticating and transitioning enables the input surface of the second human input component. For example, consider the second human input component as being a device component that can be associated with a driver where the driver is loaded during a boot process, which may depend on successful authentication of generated authentication data. In such an example, consider a keyboard with a keyboard driver that is utilized to enable use of the keyboard as a human input component.

As an example, a first human input component may be self-powered or, for example, at least in part self-powered. For example, consider a first human input component that includes piezoelectric circuitry that generates electrical energy responsive to depression of a depressible surface of the first human input component. In such an example, the electrical energy may power circuitry that can perform one or more actions.

As an example, a device can be a clamshell device that includes a closed, clamshell orientation and an open orientation and the device can include a utility tool that includes selectable actions for an opening transition from the closed, clamshell orientation to the open orientation. In such an example, the utility tool may include selectable actions for a closing transition from the open orientation to the closed, clamshell orientation. As an example, such a closing transition can include commencing generation of authentication data using the first human input component. As an example, a utility tool can include one or more graphical user interfaces (GUIs) that can be rendered to a display where one or more graphical controls can be selectable for setting one or more actions (e.g., one or more selectable actions). In such an example, a device can operate according to one or more set actions, which can include one or more opening transition actions and/or one or more closing transition actions.

As an example, a method can include transitioning a device where the transitioning includes making at least one power state transition.

As an example, transitioning a device can include making at least one boot process state transition.

As an example, transitioning a device can include making at least one power state transition and at least one boot process state transition.

As an example, an assembly can include a first human input device; a device that includes a processor, memory accessible to the processor, a display operatively coupled to the processor, and a second human input device where the second human input device includes an input surface; circuitry that commences generation of authentication data using the first human input component operatively coupled to the device where the input surface is inaccessible at the time of commencement of the generation of the authentication data; circuitry that authenticates the authentication data; and circuitry that, responsive to the authentication of the authentication data, transitions the device to a state where the input surface of the second human input component is accessible and enabled for input. In such an example, the first human input component may be detachable from the device to make the second human input component accessible.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that include at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

While various examples of circuits or circuitry have been discussed, FIG. 10 depicts a block diagram of an illustrative computer system 1000. The system 1000 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1000. As an example, the device 100 of FIG. 1, the device 400 of FIG. 4, the device 500 of FIG. 5, the device 501 of FIG. 5, the device 700 of FIG. 7, the device 800 of FIG. 8, the device 900 of FIG. 9, the device 1200 of FIG. 12, etc., can include one or more features of the system 1400 of FIG. 14.

Figure 14:
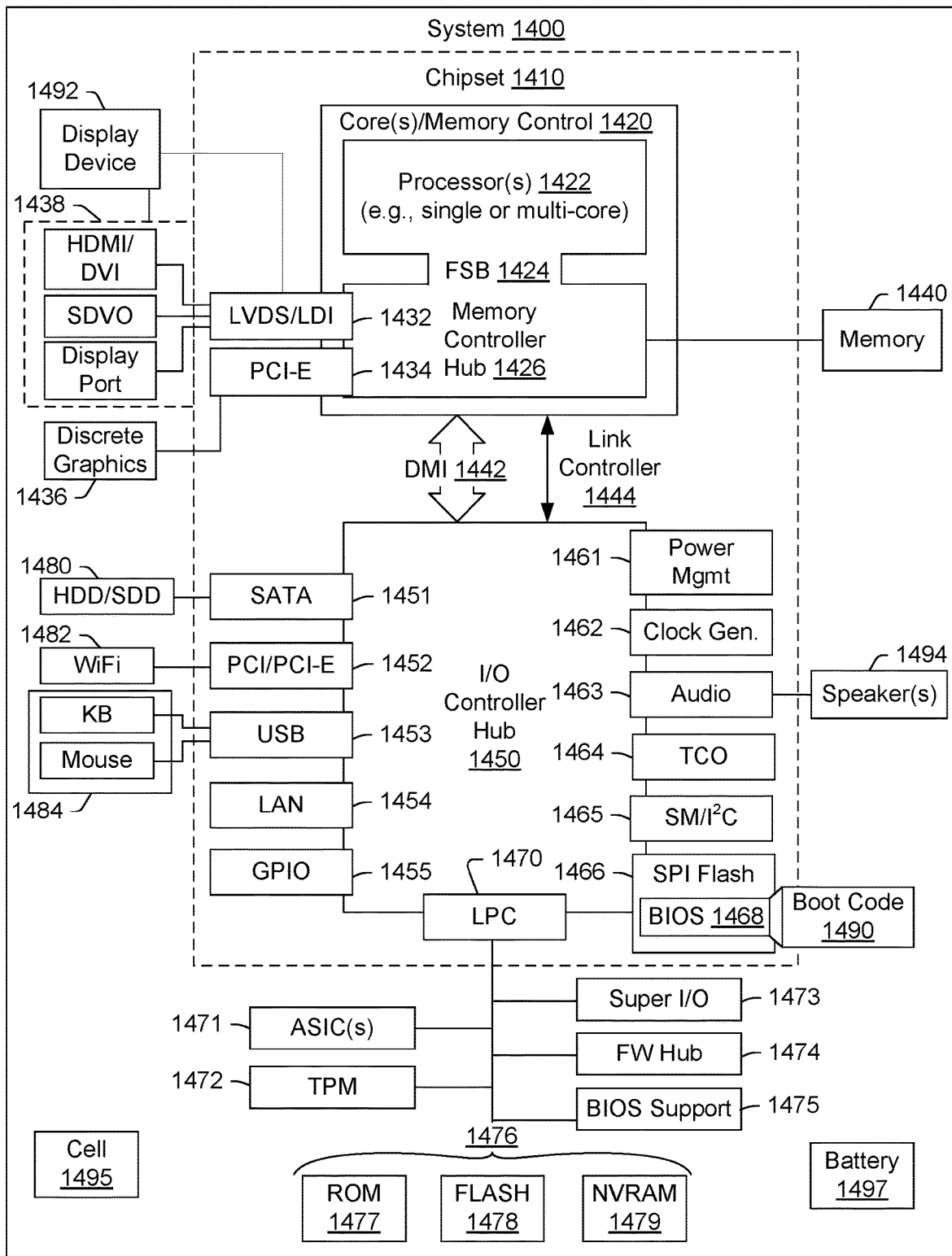
FIG. 14 is a diagram of an example of a system that includes one or more processors.

As shown in FIG. 14, the system 1400 includes a so-called chipset 1414. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 14, the chipset 1410 has a particular architecture, which may vary to some extent depending on brand or manufacturer. The architecture of the chipset 1410 includes a core and memory control group 1420 and an I/O controller hub 1450 that exchange information (e.g., data, signals, commands, etc.) via, for example, a direct management interface or direct media interface (DMI) 1442 or a link controller 1444. In the example of FIG. 14, the DMI 1442 is a chip-to-chip interface (sometimes referred to as being a link between a "northbridge" and a "southbridge").

The core and memory control group 1420 include one or more processors 1422 (e.g., single core or multi-core) and a memory controller hub 1426 that exchange information via a front side bus (FSB) 1424. As described herein, various components of the core and memory control group 1420 may be integrated onto a single processor die, for example, to make a chip that supplants the conventional "northbridge" style architecture.

The memory controller hub 1426 interfaces with memory 1440. For example, the memory controller hub 1426 may provide support for DDR SDRAM memory (e.g., DDR, DDR2, DDR3, etc.). In general, the memory 1440 is a type of random-access memory (RAM). It is often referred to as "system memory".

The memory controller hub 1426 further includes a low-voltage differential signaling interface (LVDS) 1432. The LVDS 1432 may be a so-called LVDS Display Interface (LDI) for support of a display device 1492 (e.g., a CRT, a flat panel, a projector, etc.). A block 1438 includes some examples of technologies that may be supported via the LVDS interface 1432 (e.g., serial digital video, HDMI/DVI, display port). The memory controller hub 1426 also includes one or more PCI-express interfaces (PCI-E) 1434, for example, for support of discrete graphics 1436. Discrete graphics using a PCI-E interface has become an alternative approach to an accelerated graphics port (AGP). For example, the memory controller hub 1426 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1450 includes a variety of interfaces. The example of FIG. 14 includes a SATA interface 1451, one or more PCI-E interfaces 1452 (optionally one or more legacy PCI interfaces), one or more USB interfaces 1453, a LAN interface 1454 (more generally a network interface), a general purpose I/O interface (GPIO) 1455, a low-pin count (LPC) interface 1470, a power management interface 1461, a clock generator interface 1462, an audio interface 1463 (e.g., for speakers 1494), a total cost of operation (TCO) interface 1464, a system management bus interface (e.g., a multi-master serial computer bus interface) 1465, and a serial peripheral flash memory/controller interface (SPI Flash) 1466, which, in the example of FIG. 14, includes BIOS 1468 and boot code 1490. With respect to network connections, the I/O hub controller 1450 may include integrated gigabit Ethernet controller lines multiplexed with a PCI-E interface port. Other network features may operate independent of a PCI-E interface.

The interfaces of the I/O hub controller 1450 provide for communication with various devices, networks, etc. For example, the SATA interface 1451 provides for reading, writing or reading and writing information on one or more drives 1480 such as HDDs, SDDs or a combination thereof. The I/O hub controller 1450 may also include an advanced host controller interface (AHCI) to support one or more drives 1480. The PCI-E interface 1452 allows for wireless connections 1482 to devices, networks, etc. The USB interface 1453 provides for input devices 1484 such as keyboards (KB), one or more optical sensors, mice and various other devices (e.g., microphones, cameras, phones, storage, media players, etc.). On or more other types of sensors may optionally rely on the USB interface 1453 or another interface (e.g., I²C, etc.). As to microphones, the system 1400 of FIG. 14 may include hardware (e.g., audio card) appropriately configured for receipt of sound (e.g., user voice, ambient sound, etc.).

In the example of FIG. 14, the LPC interface 1470 provides for use of one or more ASICs 1471, a trusted platform module (TPM) 1472, a super I/O 1473, a firmware hub 1474, BIOS support 1475 as well as various types of memory 1476 such as ROM 1477, Flash 1478, and non-volatile RAM (NVRAM) 1479. With respect to the TPM 1472, this module may be in the form of a chip that can be used to authenticate software and hardware devices. For example, a TPM may be capable of performing platform authentication and may be used to verify that a system seeking access is the expected system.

The system 1400, upon power on, may be configured to execute boot code 1490 for the BIOS 1468, as stored within the SPI Flash 1466, and thereafter processes data under the control of one or more operating systems and application software (e.g., stored in system memory 1440). An operating system may be stored in any of a variety of locations and accessed, for example, according to instructions of the BIOS 1468. Again, as described herein, a satellite, a base, a server or other machine may include fewer or more features than shown in the system 1400 of FIG. 14. Further, the system 1400 of FIG. 14 is shown as optionally include cell phone circuitry 1495, which may include GSM, CDMA, etc., types of circuitry configured for coordinated operation with one or more of the other features of the system 1400. Also shown in FIG. 14 is battery circuitry 1497, which may provide one or more battery, power, etc., associated features (e.g., optionally to instruct one or more other components of the system 1400). As an example, a SMBus may be operable via a LPC (see, e.g., the LPC interface 1470), via an I²C interface (see, e.g., the SM/I²C interface 1465), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
commencing generation of authentication data using a first human input component operatively coupled to a device, wherein the device comprises a processor, memory accessible to the processor, a display operatively coupled to the processor, and a second human input component that comprises an input surface, and wherein the input surface is inaccessible at the time of commencing generation of the authentication data;
authenticating the authentication data; and
responsive to the authenticating, transitioning the device to a state wherein the input surface of the second human input component is accessible and enabled for input,
wherein the device is a clamshell device that comprises a closed, clamshell orientation and an open orientation and comprises a utility tool that comprises selectable actions for an opening transition from the closed, clamshell orientation to the open orientation, wherein the utility tool comprises selectable actions for a closing transition from the open orientation to the closed, clamshell orientation, and wherein the closing transition comprises commencing generation of authentication data using the first human input component.

2. The method of claim 1 wherein the second human input component is a home button.

3. The method of claim 1 wherein the second human input component is a keyboard.

4. The method of claim 1 wherein the first human input component is detachable from the device to make the second human input component accessible.

5. The method of claim 1 wherein the first human input component is a fingerprint reader and wherein the authentication data comprise fingerprint data.

6. The method of claim 1 wherein the first human input component is a camera and wherein the authentication data comprise image recognition data.

7. The method of claim 1 wherein the device is in the closed, clamshell orientation at the time of the commencing.

8. The method of claim 7 wherein the device is in the open orientation at the time of the authenticating.

9. The method of claim 8 wherein, in the open orientation, the input surface of the second human input component is accessible and disabled until the authenticating and transitioning enables the input surface of the second human input component.

10. The method of claim 1 wherein the first human input component is self-powered.

11. The method of claim 1 wherein the first human input component comprises piezoelectric circuitry that generates electrical energy responsive to depression of a depressible surface of the first human input component.

12. The method of claim 1 wherein the transitioning the device comprises at least one power state transition.

13. The method of claim 1 wherein the transitioning the device comprises at least one boot process state transition.

14. The method of claim 1 wherein the transitioning the device comprises at least one power state transition and at least one boot process state transition.

15. An assembly comprising:
    a clamshell device that comprises a lid, a base, a processor, memory accessible to the processor, a display operatively coupled to the processor, a first human input component, and a second human input component wherein the second human input component comprises an input surface;
    circuitry that commences generation of authentication data using the first human input component operatively coupled to the clamshell device wherein the input surface is inaccessible at the time of commencement of the generation of the authentication data;
    circuitry that authenticates the authentication data;
    circuitry that, responsive to the authentication of the authentication data, transitions the clamshell device to a state wherein the input surface of the second human input component is accessible and enabled for input; and
    a utility tool that comprises selectable actions for an opening transition of the lid with respect to the base and selectable actions for a closing transition of the lid with respect to the base, wherein the selectable actions for the closing transition comprise at least one action for commencing generation of authentication data using the first human input component.

16. The assembly of claim 15 wherein the first human input component is detachable from the clamshell device to make the second human input component accessible.

17. A method comprising:
    commencing generation of authentication data using a first human input component operatively coupled to a clamshell device, wherein the clamshell device comprises a lid, a base, a processor, memory accessible to the processor, a display operatively coupled to the processor, and a second human input component that comprises an input surface, and wherein the input surface is inaccessible at the time of commencing generation of the authentication data;
    authenticating the authentication data; and
    responsive to the authenticating, transitioning the device to a state wherein the input surface of the second human input component is accessible and enabled for input,
    wherein the clamshell device comprises a utility tool that comprises selectable actions for an opening transition of the lid with respect to the base and selectable actions for a closing transition of the lid with respect to the base, and wherein the selectable actions for the closing transition comprise at least one action for commencing generation of authentication data using the first human input component.

18. The method of claim 1 comprising requiring re-authenticating and, prior to re-authentication, responsive to receipt of one or more signals indicative of tampering, preventing access to data stored in a data storage component of the device.

19. The assembly of claim 15 comprising circuitry that, responsive to a failed authentication and physical tampering with the clamshell device, prevents access to data stored in a data storage component of the clamshell device.

20. The assembly of claim 15 wherein the first human input component is a fingerprint reader and wherein the authentication data comprise fingerprint data.

* * * * *